(12) United States Patent
Li et al.

(10) Patent No.: US 11,807,716 B2
(45) Date of Patent: Nov. 7, 2023

(54) OLIGOMER (2,6-DIMETHYLPHENYLENE ETHER) TOGETHER WITH FABRICATION METHOD AND CURED PRODUCT THEREOF

(71) Applicant: CPC Corporation, Taiwan, Kaohsiung (TW)

(72) Inventors: Sheng-De Li, Chiayi (TW); Ching-Hsuan Lin, Taichung (TW); Yi-Hsuan Hsieh, Taichung (TW); Wei-Yen Chen, Chiayi (TW); Way-Chih Hsu, Chiayi (TW); Jui-Fu Kao, Chiayi (TW); Ming-Yu Huang, Chiayi (TW); Jann-Chen Lin, Chiayi (TW); Yih-Ping Wang, Chiayi (TW)

(73) Assignee: CPC Corporation, Taiwan, Kaohsiung (TW)

( * ) Notice: Subject to any disclaimer, the term of this patent is extended or adjusted under 35 U.S.C. 154(b) by 486 days.

(21) Appl. No.: 17/130,751

(22) Filed: Dec. 22, 2020

(65) Prior Publication Data

US 2021/0340320 A1    Nov. 4, 2021

(30) Foreign Application Priority Data

May 4, 2020    (TW) .................. 109114818

(51) Int. Cl.
*C08G 65/44*    (2006.01)
*C08G 65/48*    (2006.01)

(52) U.S. Cl.
CPC .................. *C08G 65/44* (2013.01)

(58) Field of Classification Search
None
See application file for complete search history.

(56) References Cited

U.S. PATENT DOCUMENTS 5,114,780 A * 5/1992 Mercer ............. H01L 23/49894
                                                    428/209
5,115,082 A * 5/1992 Mercer ................. H01L 23/293
                                                    528/125

(Continued)

OTHER PUBLICATIONS

Y. Wang et al. "Bio-based Anethole-Functionalized Poly(phenylene oxides) (PPOs): New Low Dielectric Materials with High Tg and Good Dimensional Stability" ACS Sustainable Chem. Eng., Just Accepted Manuscript Publication Date (Web): Jun. 5, 2018 Downloaded from http://pubs.acs.org on Jun. 6, 2018.

(Continued)

*Primary Examiner* — Randy P Gulakowski
*Assistant Examiner* — Ha S Nguyen
(74) *Attorney, Agent, or Firm* — Demian K. Jackson; Jackson IPG PLLC

(57) ABSTRACT

An oligomer (2,6-dimethylphenylene ether) is provided. Its structure is shown as follows:

(Continued)

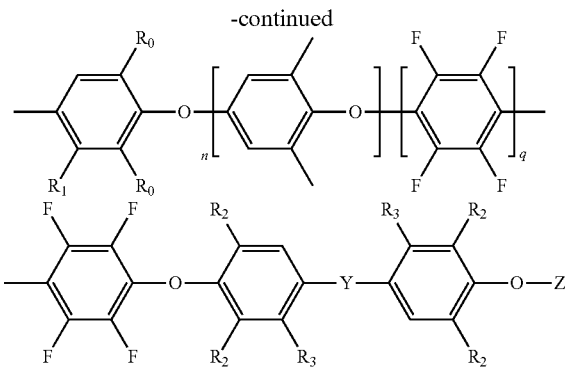

which comprises separately independent hydrogen; alkyl or phenyl; separately independent —NR—, —CO—, —SO—, —CS—, —SO$_2$—, —CH$_2$—, —O—, null, —C(CH$_3$)$_2$—, or

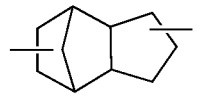

and a hydrogen,

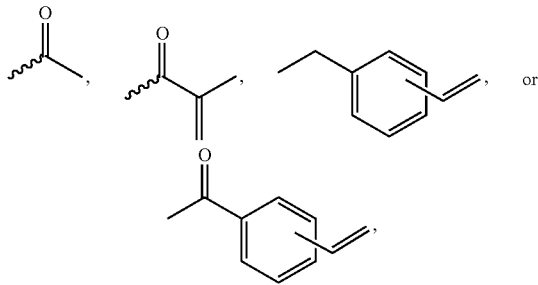

The features of the cured products include a high glass-transition temperature, a low dielectric feature, preferred thermal stability, and good flame retardancy. The present invention effectively controls the number-average molecular weight of the product to obtain excellent organic solubility.

15 Claims, 6 Drawing Sheets

(56) References Cited

U.S. PATENT DOCUMENTS

| | | |
|---|---|---|
| 6,352,782 B2 | 3/2002 | Yeager et al. |
| 6,627,704 B2 | 9/2003 | Yeager et al. |
| 6,995,195 B2 | 2/2006 | Ishii et al. |
| 8,791,214 B2 | 7/2014 | Takeuchi et al. |

OTHER PUBLICATIONS

H. J. Hwang et al. "Dielectric Behavior and Properties of a Cyanate Ester Containing Dicyclopentadiene. I" Received Apr. 2, 2004; accepted Sep. 11, 2004 Published online in Wiley InterScience (www.interscience.wiley.com).

H. J. Hwang et al. "Flame Retardancy and Dielectric Properties of Dicyclopentadiene-Based Benzoxazine Cured with a Phosphorus-Containing Phenolic Resin" Received May 29, 2006; accepted May 31, 2008 Published online Aug. 18, 2008 in Wiley InterScience (www.interscience.wiley.com).

G. Hougham et al. "Synthesis and Properties of Highly Fluorinated Polyimides" Macromolecules 1994, 27, 3642-3649.

I.M. Tkachenko et al. "Synthesis, gas transport and dielectric properties of fluorinated poly(arylene ether)s based on decafluorobiphenyl " Materials Chemistry and Physics (2016), doi: 10.1016/j.matchemphys.2016.08.028.

Y. Ishii et al. "Syntheses and Properties of Allylated Poly(2,6-dimethyl-1,4-phenylene ether)" Designed Products aboratory, Asahi Chemical Industry Company, Ltd., Kawasaki, Kanagawa 210, Japan Downloaded from pubs.acs.org on Dec. 7, 2016.

L. Tao et al. "Synthesis and characterization of highly optical transparent and low dielectric constant fluorinated polyimides" Polymer 50 (2009) 6009-6018.

H. J. Hwang et al. "Synthesis and properties of bismaleimide resin containing dicyclopentadiene or dipentene. VI" Polym Int 55:1341-1349 (2006).

* cited by examiner

| | $M_w$ (g/mol) | $M_n$ (g/mol) | PDI | Disolved in toluene (50 wt%) | Disolved in butanone (50 wt%) |
|---|---|---|---|---|---|
| State-of-use 1 | 5512 | 3714 | 1.427 | ++* | ++ |
| State-of-use 2 | 10393 | 6069 | 1.705 | ++ | ++ |
| State-of-use 3 | 11335 | 6469 | 1.752 | ++ | ++ |
| State-of-use 4 | 11676 | 6515 | 1.792 | ++ | ++ |
| State-of-use 5 | 11941 | 6747 | 1.770 | ++ | ++ |
| State-of-use 6 | 12368 | 6818 | 1.814 | ++ | ++ |

*++ Soluble and clear

FIG.3

|  | $T_g$ (°C) (DMA) | $T_g$ (°C) (TMA) | CTE (ppm/°C) | $T_{d5\%}$ (°C) | Char Yield (%) |
|---|---|---|---|---|---|
| Compare P. 1 -1 | 235 | 210 | 63 | 457 | 20 |
| Compare P. 1 -2 | 229 | 204 | 76 | 395 | 27 |
| State-of-use 7-1 | 230 | 206 | 62 | 473 | 42 |
| State-of-use 7-2 | 236 | 214 | 74 | 439 | 45 |
| State-of-use 7-3 | 237 | 219 | 66 | 453 | 46 |
| Compare P. 2 | 221 | 189 | 72 | 433 | 16 |
| State-of-use 8-1 | 197 | 178 | 67 | 425 | 32 |
| State-of-use 8-2 | 218 | 187 | 68 | 440 | 33 |
| State-of-use 8-3 | 222 | 192 | 74 | 435 | 39 |

FIG.4

|  | Thick (μm) | 10 GHz | |
|---|---|---|---|
|  |  | Dielectric constant ($D_k$) | Dielectric loss ($D_f$) ($*10^3$) |
| Compare P. 1-1 | 195 | 2.70 ± 0.001 | 3.1 ± 0.1 |
| Compare P. 1-2 | 237 | 2.69 ± 0.001 (1 GHz) | 6.9 ± 0.5 (1 GHz) |
| State-of-use 7-1 | 202 | 2.46 ± 0.002 | 2.3 ± 0.1 |
| State-of-use 7-2 | 239 | 2.57 ± 0.001 | 5.6 ± 0.1 |
| State-of-use 7-3 | 298 | 2.62 ± 0.001 | 2.9 ± 0.1 |
| Compare P. 2 | 260 | 2.75 ± 0.001 | 8.0 ± 0.1 |
| State-of-use 8-1 | 221 | 2.59 ± 0.002 (1 GHz) | 8.2 ± 0.1 (1 GHz) |
| State-of-use 8-2 | 215 | 2.48 ± 0.001 | 9.2 ± 0.2 |
| State-of-use 8-3 | 265 | 2.67 ± 0.002 | 9.3 ± 0.1 |

FIG.5

|  | UL-94 Test | | | |
|---|---|---|---|---|
|  | First (sec) | Second (sec) | Dripping | Level |
| Compare P. 1-1 | 2.0 | 2.0 | No | V-0 |
| Compare P. 1-2 | 3.3 | 2.0 | Yes | V-1 |
| State-of-use 7-1 | 0.7 | 0.2 | No | V-0 |
| State-of-use 7-2 | 0.6 | 0.3 | No | V-0 |
| State-of-use 7-3 | 1.5 | 0.3 | No | V-0 |
| Compare P. 2 | 6.5 | 7.4 | Yes | V-1 |
| State-of-use 8-1 | 2.1 | 1.6 | No | V-0 |
| State-of-use 8-2 | 0.7 | 0.3 | No | V-0 |
| State-of-use 8-3 | 1.7 | 1.4 | No | V-0 |

FIG.6

OLIGOMER (2,6-DIMETHYLPHENYLENE ETHER) TOGETHER WITH FABRICATION METHOD AND CURED PRODUCT THEREOF

TECHNICAL FIELD OF THE INVENTION

The present invention relates to an oligomer; more particularly, to an oligomer (2,6-dimethylphenylene ether), whose features of cured products include a high glass-transition temperature, a low dielectric property, preferred thermal stability, and good flame retardance while the number-average molecular weight (Mn) of the oligomer is effectively controlled for obtaining excellent organic solubility.

DESCRIPTION OF THE RELATED ARTS

As semiconductor technology improves, electronic devices keep shrinking in size, so that the line width of the metal wires of circuit board becomes increasingly thin and line spacing between the wires gets smaller and smaller to meet needs. However, during fabricating metal wires, there are two major issues that affect performance. An issue is about the signal transmission delay (resistive-capacitive delay) caused by the wires and dielectric layer. The other issue is about the signal interference (cross talk) between the metal wires for wiring. As is known from a document (Microelectronics Technology 1995, 614 (614), 485-503.,) the signal transmission speed has an inverse ratio to the square root of the dielectric constant. The lower is the dielectric loss (dissipation factor,) the easier is the maintenance of signal integrity. Hence, the decrease of the dielectric constant and dielectric loss is a trend unavoidable, which makes how to fabricate a material having excellent electrical features becomes a most important issue.

Epoxy resin is a thermoset material. After being reacted with a hardening agent, a three-dimensional network cross-linked structure is formed for obtaining a good mechanical performance, chemical resistance, adhesion, and thermal feature for insulation. However, on using the conventional phenol and amine hardeners, a high-polarity secondary alcohol is generated after processing polymerization with the open-ring of epoxy resin, where the dielectric features are hard to be improved. In 2014, DIC corp. issued a patent, where a few compounds having phenol, like phenol novolac (PN) and dicyclopentadiene phenol novolac (DCPDPN), are reacted with a monofunctional or difunctional acyl chloride to obtain a curing agent having active ester group and, then, is cured with an epoxy resin HP7200. During reacting with the open-ring of epoxy resin, an ester-exchange reaction with active ester group happens without generating high-polarity secondary alcohol, which aids in reducing the dielectric constant. Although the hydroxyl group of the hardener can be modified into ester group for reducing dielectric feature, ester group will replace the original hydroxyl group after opening the ring of epoxy resin as the active ester group reacts with the epoxy resin to reduce intermolecular hydrogen-bond force with the glass-transition temperature of the cured product decreased. Hence, how to reduce the dielectric features with the thermal features maintained at the same time is very important, too.

Poly (2,6-dimethyl-1,4-phenylene oxide) (PPO) as one of five engineering plastics is a non-crystalline thermoplastic polymer, which has a high molecular weight and a rigid structure together with a high glass-transition temperature, good shock-proof capacity, and a low expansion coefficient. Moreover, it does not have hydrolyzable bond and polar functional group, while obtains excellent electrical features. Yet, its high molecular weight results in high viscosity and poor solubility in organic solvents, so that the applications of PPO are limited.

A U.S. patent reveals a modification method of PPO into (2,6-dimethylphenylene ether) oligomer, which is also known as oligo phenylene ether (OPE). However, the (2,6-dimethylphenylene ether) oligomer has poor heat resistance, whose terminal groups need to be modified to form end groups having a crosslinked structure, like commercially available acrylic-terminated SA9000 (SABIC Corp.)

A U.S. patent aims at modifying PPO and its terminal groups, such as commercially available OPE-2St (MGC Corp.) having terminal groups of vinyl benzyl ether.

The structures of SA9000 and OPE-2St are shown as follows:

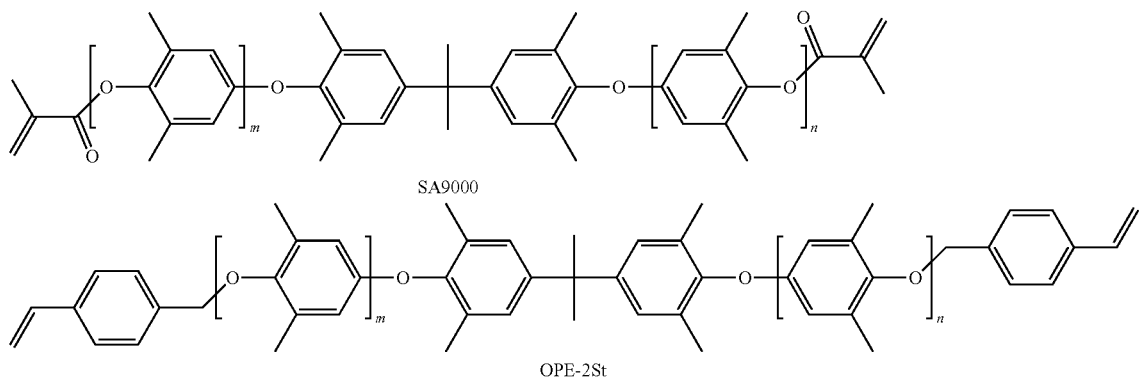

In recent years, the modification of PPO is researched and revealed in documents. In 2018, Wang et al used biobased anethole to introduce PPO having different bromination ratios to obtain sidechain having crosslinked structure. The crosslinked structure has a dielectric constant reaching 2.74 and a glass-transition temperature reaching more than 220 degrees Celsius, which obtains excellent thermostability and is well suited for electronic materials.

As shown in the above documents, the performance of PPO copolymer can be enhanced through modifying PPO. In 1994, Hougham et al synthesized a series of fluorine-containing polyimides (PIs) and proposed the introduction of fluorine-containing structures for reducing dielectric constants. Their methods include improving hydrophobicity, increasing free volume, and decreasing polarity. In 2009, Yang et al introduced trifluoromethyl to a main chain of a material for synthesizing different fluorinated degrees of PIs, where the dielectric constants decrease as the proportions of fluorine increase. Besides, because trifluoromethyl has a highly hydrophobic structure with low water absorption, excellent glass-transition temperatures are shown. In 2016, Shevchenko et al used decafluorobiphenyl to synthesize a polyether having a fluorine-containing structure, where the fluorine-containing structure increases in free volume and the polyether shows excellent dielectric features. Consequently, the introduction of the fluorine-containing structure effectively increases free volume and its C—F chain has lower polarity, which is used to fabricate a material having low dielectricity and good thermostability.

In addition, flame retardancy of conventional PPO material only reaches a rating of V-1 for test under UL-94 specifications. For achieving V-0 rating, additional flame retardant is required. For example, a U.S. company, GE, announced a patent that, after SA120 is methyl-acrylated at the terminal group as being used as a flame retardant, it is copolymerized with functionalized SA190 to obtain a flame-retardant PPO resin. Nevertheless, the dielectric constant at 1 mega-hertz will soar from 3.86 to 5.07 and the dielectric loss will soar from 0.0024 to 0.0065, which will lose the excellent dielectric features of PPO.

Dicyclopentadiene (DCPD) is a C5 cracking by-product of petroleum. Due to its high boiling point, it is easy to separate. Its structure is a rigid aliphatic double-ring, whose derivative has excellent thermal and dielectric features. From 2006 to 2008, Hwang et al developed a series of dicyclopentadiene derivatives, including cyanate, bismaleimide, and benzoxazine. Their cured products all exhibits excellent glass-transition temperatures and dielectric features.

Based on the above description, a (2,6-dimethylphenylene ether) oligomer having excellent performance and versatility, which, after being cured, obtains thermostability, electrical features, and flame retardancy, is yet to be developed. Hence, the prior arts do not fulfill all users' requests on actual use.

SUMMARY OF THE INVENTION

The main purpose of the present invention is to overcome the above-mentioned problems encountered by the prior arts and provide an oligomer (2,6-dimethylphenylene ether) and a cured product thereof, which is characterized in a high glass-transition temperature, a low dielectric property, good thermal stability, and good flame retardancy.

Another purpose of the present invention is to provide a method for fabricating the oligomer (2,6-dimethylphenylene ether), whose number-average molecular weight (Mn) of the oligomer is effectively controlled for obtaining excellent organic solubility.

To achieve the above purposes, the present invention is an oligomer (2,6-dimethylphenylene ether), where the oligomer (2,6-dimethylphenylene ether) has a structure shown below as Formula (1):

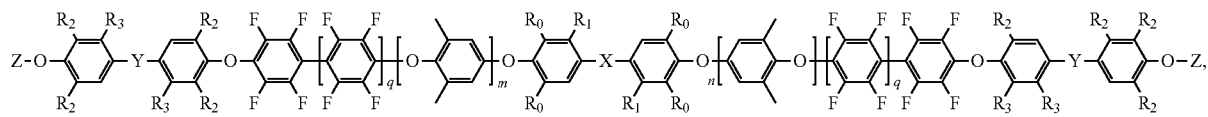

(C)

where each one of $R_0$, $R_1$, $R_2$, and $R_3$ is separately independent hydrogen, C1-C6 alkyl, or phenyl; each one of n and m is a separately independent integer of 0~300; q is an integer of 0 or 1; each one of X and Y is separately independent —NR—, —CO—, —SO—, —CS—, —SO$_2$—, —CH$_2$—, —O—, null, —C(CH$_3$)$_2$—, or

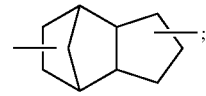

and Z is hydrogen,

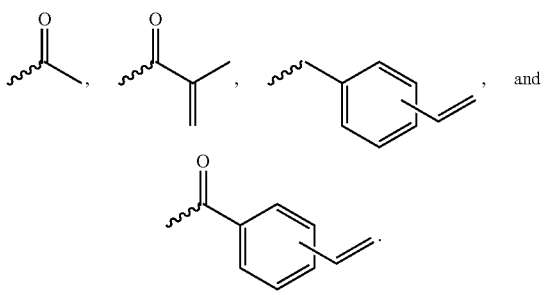

where the oligomer has a fabrication method, comprising the following steps: (a) phenol terminal of a (2,6-dimethylphenylene ether) oligomer shown with Formula (2):

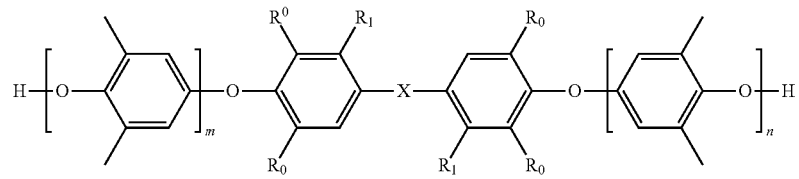

is catalyzed with an alkaline catalyst to process reaction with hexafluorobenzene or decafluorobiphenyl shown with Formula (3):

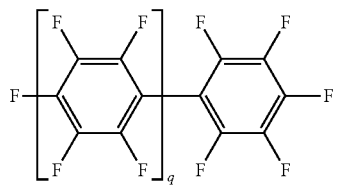

to obtain a fluorine-containing (2,6-dimethylphenylene ether) oligomer shown with Formula (4):

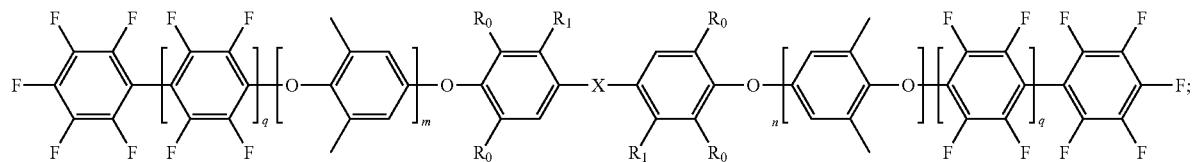

(b) the fluorine-containing (2,6-dimethylphenylene ether) oligomer is catalyzed with the alkaline catalyst to process reaction with a bisphenol to obtain a fluorine-containing (2,6-dimethylphenylene ether) bisphenol-oligomer shown with Formula (5):

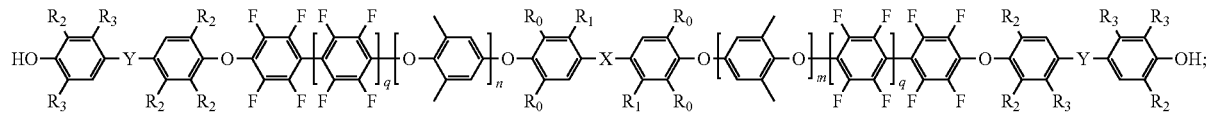

and (c) the oligomer shown with Formula (1) is obtained through a process in which: (i) the fluorine-containing (2,6-dimethylphenylene ether) bisphenol-oligomer is catalyzed with tertiary nitrogen catalyst or the alkaline catalyst to process reaction with acetic anhydride to obtain a first oligomer (2,6-dimethylphenylene ether); (ii) the fluorine-containing (2,6-dimethylphenylene ether) bisphenol-oligomer is catalyzed with the tertiary nitrogen catalyst or the alkaline catalyst to process reaction with methyl acrylic anhydride to obtain a second oligomer (2,6-dimethylphenylene ether); (iii) the fluorine-containing (2,6-dimethylphenylene ether) bisphenol-oligomer is catalyzed with the alkaline catalyst to process reaction with halomethylstyrene to obtain a third oligomer (2,6-dimethylphenylene ether); or (iv) the fluorine-containing (2,6-dimethylphenylene ether) bisphenol-oligomer is catalyzed with a coupling reagent and an acyl transfer agent to process reaction with vinylbenzoic acid to obtain a fourth oligomer (2,6-dimethylphenylene ether); and where the oligomer has a cured product obtained through a process in which (i) the second oligomer (2,6-dimethylphenylene ether), the third oligomer (2,6-dimethylphenylene ether) or the fourth oligomer (2,6-dimethylphenylene ether) is mixed with a catalyst to process heat-curing to obtain the cured product; or (ii) the first oligomer (2,6-dimethylphenylene ether), the second oligomer (2,6-dimethylphenylene ether) or the fourth oligomer (2,6-dimethylphenylene ether) is mixed with an equivalent of epoxy resin to be copolymerized with an epoxy ring-opening agent and a double-bond initiator to obtain the cured product through heating.

BRIEF DESCRIPTION OF THE DRAWINGS

The present invention will be better understood from the following detailed description of the preferred embodiment according to the present invention, taken in conjunction with the accompanying drawings, in which

FIG. 3 is the view showing the solubility for the various molecular weights of State-of-use 1 to State-of-use 6;

FIG. 4 is the view showing the thermal features of the cured products;

FIG. 5 is the view showing the electrical features of the cured products; and

FIG. 6 is the view showing the flame retardance property of the cured products.

DESCRIPTION OF THE PREFERRED EMBODIMENT

Figure 1:
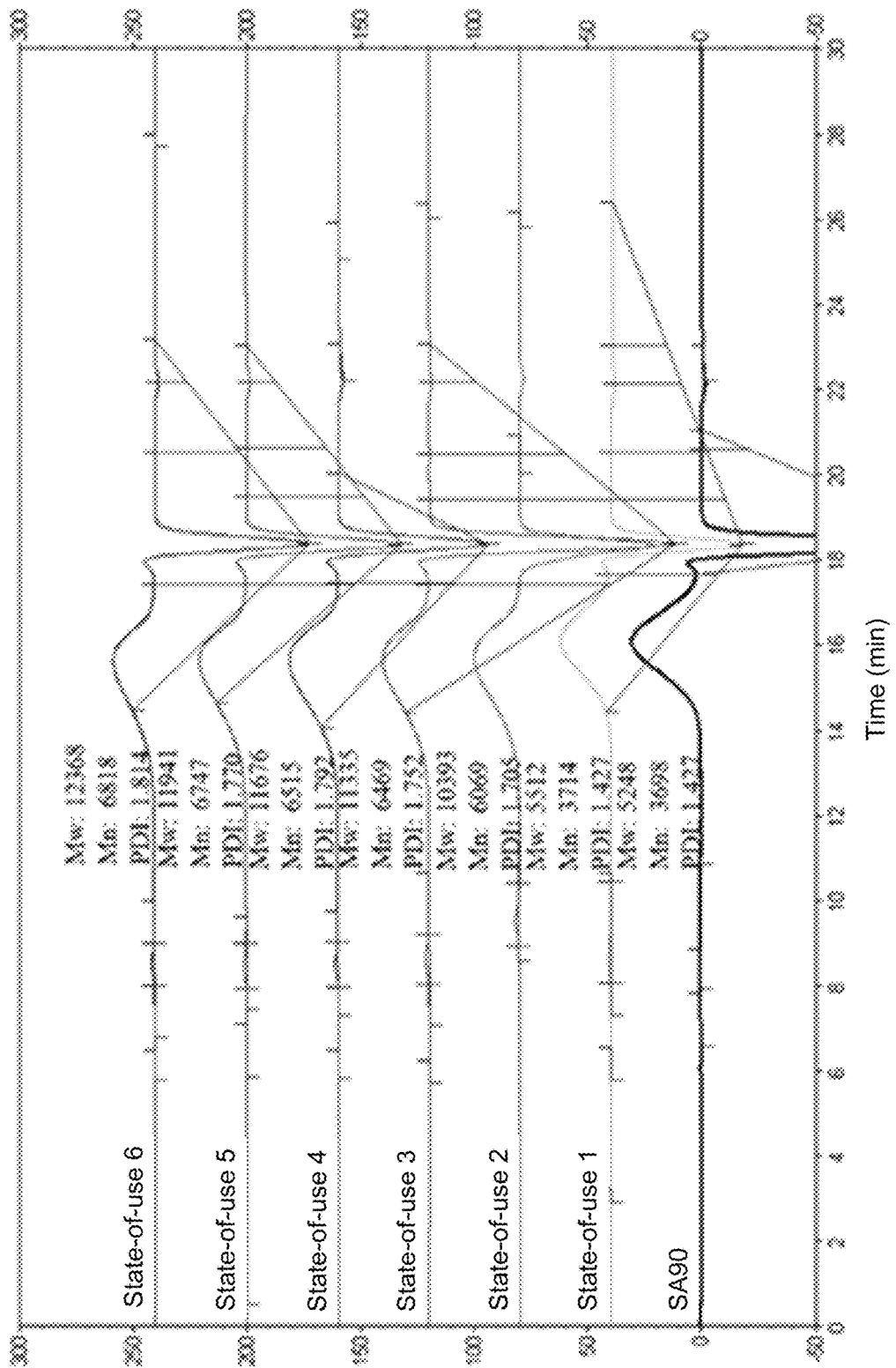
FIG. 1 is the view showing the molecular weight distributions of commercially available SA90 and State-of-use 1 to State-of-use 6.

The following description of the preferred embodiment is provided to understand the features and the structures of the present invention.

Please refer to FIG. 1 to FIG. 6, which are a view showing molecular weight distributions of commercially available SA90 and State-of-use 1 to State-of-use 6; a view showing water absorption rates of cured products and comparative products; a view showing solubility for various molecular weights of State-of-use 1 to State-of-use 6; a view showing thermal features of the cured products; a view showing electrical features of the cured products; and a view showing flame retardance property of the cured products. As shown in the figures, the present invention is an oligomer (2,6-dimethylphenylene ether) together with a fabrication method and a cured product thereof, where the oligomer (2,6-dimethylphenylene ether) has a structure shown below as Formula (1):

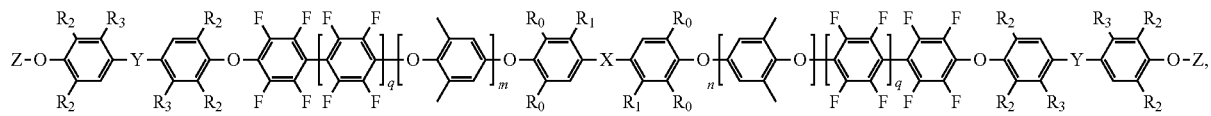

where each one of $R_0$, $R_1$, $R_2$, and $R_3$ is separately independent hydrogen, C1-C6 alkyl, or phenyl; each one of n and m is a separately independent integer of 0~300; q is an integer of 0 or 1; each one of X and Y is independent —NR—, —CO—, —SO—, —CS—, —SO$_2$—, —CH$_2$—, —O—, null, —C(CH$_3$)$_2$—, or

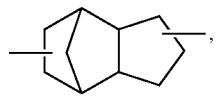

separately; and Z is hydrogen,

 or

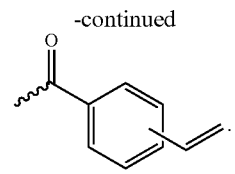

[Fabrication Method of Oligomer (2,6-dimethylphenylene ether)]

The oligomer according to the present invention has a fabrication method, comprising the following steps:

(a) First step: A (2,6-dimethylphenylene ether) oligomer having phenol terminal shown with Formula (2):

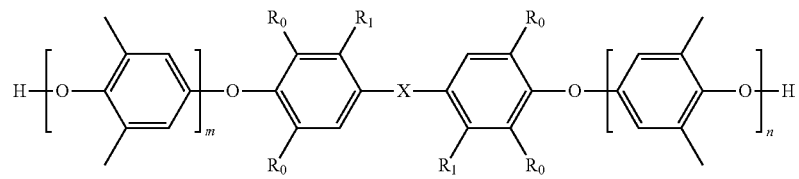

is catalyzed with an alkaline catalyst to process reaction with hexafluorobenzene or decafluorobiphenyl shown with Formula (3):

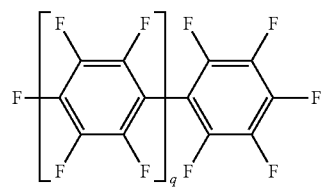

to obtain a fluorine-containing (2,6-dimethylphenylene ether) oligomer shown with Formula (4):

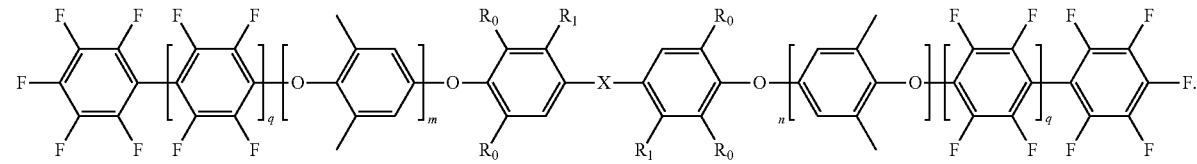

Therein, each one of $R_0$, $R_1$, $R_2$, and $R_3$ is separately independent hydrogen, C1-C6 alkyl, or phenyl; X is separately independent —NR—, —CO—, —SO—, —CS—, —$SO_2$—, —$CH_2$—, —O—, null, —$C(CH_3)_2$—, or

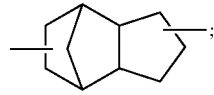

each one of n and m is a separately independent integer of 0~300; and q is an integer of 0 or 1.

The alkaline catalyst is potassium carbonate ($K_2CO_3$), sodium carbonate ($Na_2CO_3$), potassium hydroxide (KOH), sodium hydroxide (NaOH), sodium bicarbonate ($NaHCO_3$), sodium acetate, or a combination of at least two of the above.

The (2,6-dimethylphenylene ether) oligomer having phenol terminal thus obtained as shown with Formula (2) is a

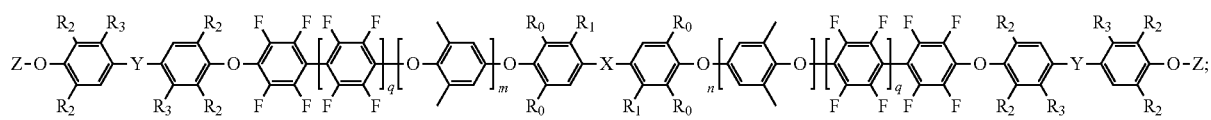

commercially available SA90, where the number-average molecular weight of SA90 is about 1508 grams per mole.

After a compound of hexafluorobenzene (q is 0) shown with Formula (3) is reacted with a compound shown with Formula (2) for fabrication, a fluorine-containing (2,6-dimethylphenylene ether) oligomer shown with Formula (4) is obtained, where the fluorine-containing (2,6-dimethylphenylene ether) oligomer has a terminal of pentafluoro structure (q is 0.)

After a compound of decafluorobiphenyl (q is 1) shown with Formula (3) is reacted with the compound shown with Formula (2) for fabrication, the fluorine-containing (2,6-dimethylphenylene ether) oligomer shown with Formula (4) is obtained, where the fluorine-containing (2,6-dimethylphenylene ether) oligomer has a nonafluoro terminal structure (q is 1.)

(b) Second step: The fluorine-containing (2,6-dimethylphenylene ether) oligomer is catalyzed with the alkaline catalyst to process reaction with a bisphenol to obtain a fluorine-containing (2,6-dimethylphenylene ether) bisphenol-oligomer shown with Formula (5):

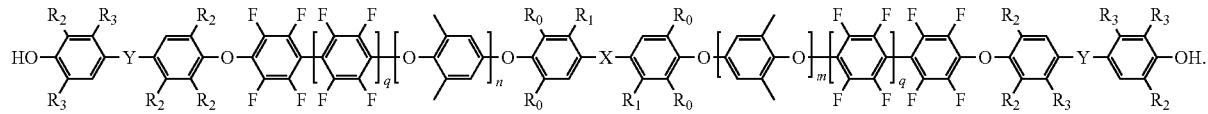

Therein, Y has the same definition as X, which is also separately independent; R2 and R 3 have the same definition as R0 and R1, which is also separately independent; and n, m, and q are defined as described above as thus omitted here.

The bisphenol is dicyclopentadiene-2,6-bisphenol; dicyclopentadiene-bisphenol; 3,3',5,5'-tetramethyl biphenyl-4,4'-diol; tetramethyl bisphenol A; 4,4'-biphenol; bisphenol A; tetramethyl bisphenol F; or bisphenol F.

(c) Third step: The fluorine-containing (2,6-dimethylphenylene ether) bisphenol-oligomer is catalyzed with a tertiary nitrogen catalyst or the alkaline catalyst to process reaction with acetic anhydride to obtain a first oligomer (2,6-dimethylphenylene ether). Or, the fluorine-containing (2,6-dimethylphenylene ether) bisphenol-oligomer is catalyzed with the tertiary nitrogen catalyst or the alkaline catalyst to process reaction with methyl acrylic anhydride to obtain a second oligomer (2,6-dimethylphenylene ether). Or, the fluorine-containing (2,6-dimethylphenylene ether) bisphenol-oligomer is catalyzed with the alkaline catalyst to process reaction with halomethylstyrene to obtain a third oligomer (2,6-dimethylphenylene ether). Or, the fluorine-containing (2,6-dimethylphenylene ether) bisphenol-oligomer is catalyzed with a coupling reagent and an acyl transfer agent to process reaction with vinylbenozic acid to obtain a fourth oligomer (2,6-dimethylphenylene ether). Therein, the oligomer (2,6-dimethylphenylene ether) has the structure shown as Formula (1):

and is the first oligomer (2,6-dimethylphenylene ether) (when Z is

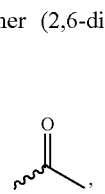

the second oligomer (2,6-dimethylphenylene ether) (when Z is

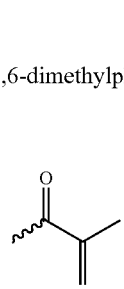

the third oligomer (2,6-dimethylphenylene ether) (when Z is

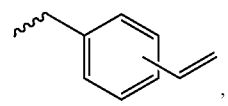

or the fourth oligomer (2,6-dimethylphenylene ether) (when Z is

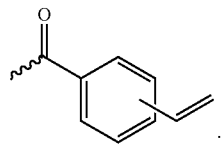

Therein, Z is hydrogen,

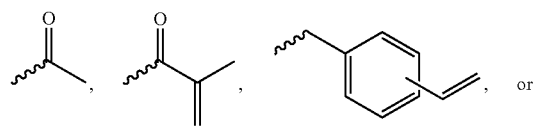, or

-continued

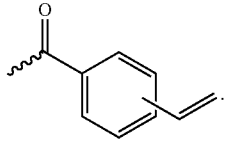

X, Y, $R_0$, $R_1$, $R_2$, $R_3$, n, m, and q are defined as described above as thus omitted here.

The tertiary nitrogen catalyst is 4-dimethylaminopyridine (DMAP), pyridine, imidazole, dimethylimidazole, 2-methylimidazole, or a combination of at least two of the above.

The coupling agent is N,N'-dicyclohexyl carbodiimide, N,N'-diisopropyl carbodiimide, or a combination of the above.

The acyl transfer agent is DMAP, pyridine, or a combination of the above.

The first oligomer (2,6-dimethylphenylene ether) has a compound structure as shown below:

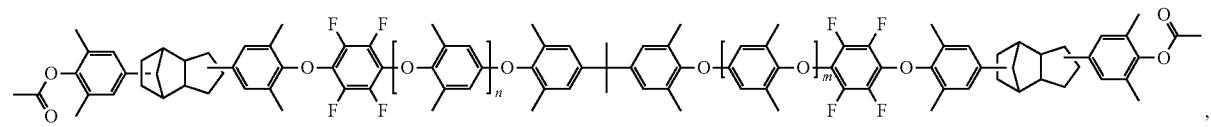

where n and m are defined as described above as thus omitted here.

The second oligomer (2,6-dimethylphenylene ether) has a compound structure as shown below:

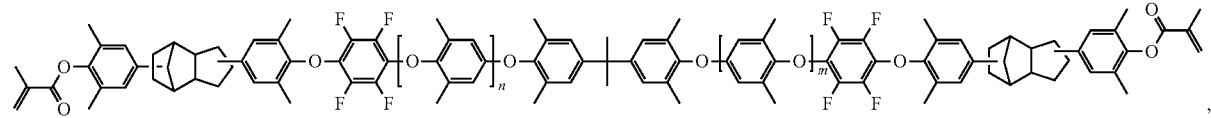

where n and m are defined as described above as thus omitted here.

The third oligomer (2,6-dimethylphenylene ether) has a compound structure as shown below:

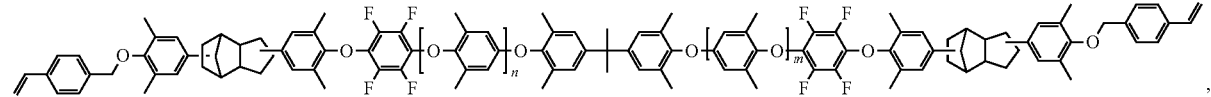

where n and m are defined as described above as thus omitted here.

The fourth oligomer (2,6-dimethylphenylene ether) has a compound structure as shown below:

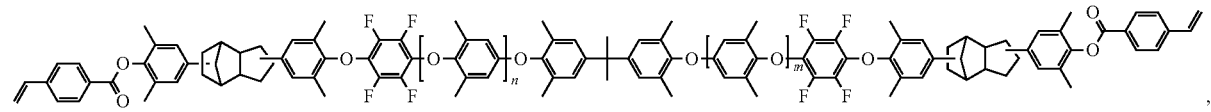

where n and m are defined as described above as thus omitted here.

[Cured Product]

The cured product is obtained through heat-curing after the second oligomer (2,6-dimethylphenylene ether), the third oligomer (2,6-dimethylphenylene ether), or the fourth oligomer (2,6-dimethylphenylene ether) is mixed with a catalyst; or is obtained through heating and copolymerizing with an epoxy ring-opening agent and a double-bond initiator after the first oligomer (2,6-dimethylphenylene ether), the second oligomer (2,6-dimethylphenylene ether), or the fourth oligomer (2,6-dimethylphenylene ether) is mixed with an equivalent of epoxy resin.

The catalyst is benzoyl peroxide, t-butyl cumyl peroxide, or a combination of the above.

In a total weight of the second oligomer (2,6-dimethylphenylene ether), the third oligomer (2,6-dimethylphenylene ether), or the fourth oligomer (2,6-dimethylphenylene ether), the catalyst has a content of 0.1~1.0 weight percent (wt %).

The epoxy ring-opening agent is DMAP, pyridine, imidazole, dimethylimidazole, 2-methylimidazole, or a combination of the above.

In a total weight of the epoxy resin, the ring-opening agent has a content of 0.5~2.0 wt %.

The double-bond initiator is benzoyl peroxide, t-butyl cumyl peroxide, di-t-butyl cumyl peroxide, or a combination of the above.

In a total weight of the first oligomer (2,6-dimethylphenylene ether), the second oligomer (2,6-dimethylphenylene ether), or the fourth oligomer (2,6-dimethylphenylene ether), the double-bond initiator has a content of 0.1~1.0 wt %.

The present invention is more specifically described below. Even with the following descriptions, the materials, amounts, ratios, and process details and flows can be suitably varied. Therefore, the present invention is not interpreted restrictively according to the following descriptions.

[Fabrication of Fluorine-Containing (2,6-dimethylphenylene ether) oligomer]

A difunctional (2,6-dimethylphenylene ether) oligomer according to the present invention is obtained through the following steps, which is merely an exemplary description and is not intended to limit the present invention. The (2,6-dimethylphenylene ether) oligomer having phenol terminal groups is catalyzed with the alkaline catalyst to process reaction with hexafluorobenzene to obtain a fluorine-containing (2,6-dimethylphenylene ether) oligomer, whose formula is as follows:

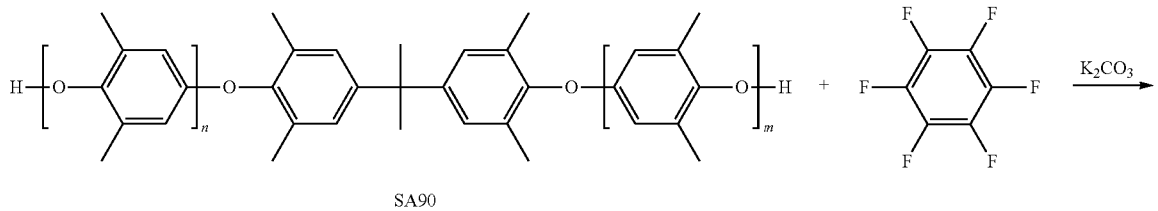

SA90

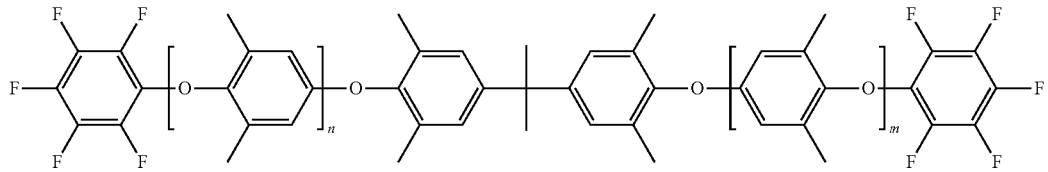

with n and m defined as described above as thus omitted here.

[State-of-Use 1] Synthesis of Fluorine-Containing (2,6-dimethylphenylene ether) oligomer In a 100-milliliter (ml) three-necked reactor, 5 grams (g) (i.e. 3.125 millimole (mmol)) of SA90, 2.91 g (i.e. 3.125*5 mmol) of hexafluorobenzene, 0.95 g (i.e. 3.125*2.2 mmol) of $K_2CO_3$, and 20 g of N,N-dimethyl acetamide are added. Then, under a nitrogen atmosphere, the temperature is raised up to 80 degrees Celsius (° C.) for 36 hours (hrs) of a reaction. After the reaction, it is cooled down to a room temperature. A mixture thus obtained is poured out into methanol water for precipitation and is washed several times with methanol water. At last, suction and filtration are processed to dry a filter cake under vacuum at 60° C. to obtain a white powdery product having the following structure:

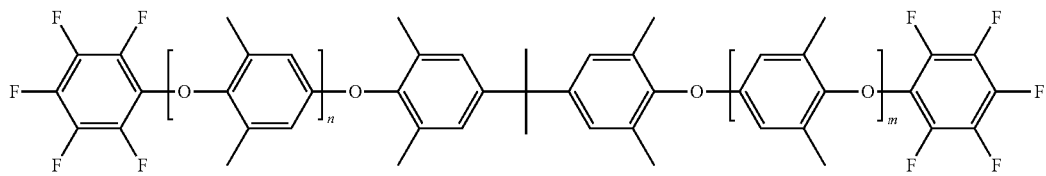

with a yield of 92 percent (%), where each one of n and m is a separately independent integer of 0~300.

Then, a ¹H spectrum of nuclear magnetic resonance (NMR) is measured for a sample by using a high-resolution (400 megahertz (MHz)) NMR spectrometer, Model: Varian Mercury 40, for identifying the structure of the sample. Deutero-dimethyl sulfoxide (DMSO-d6) or deuterochloroform (Chloroform-d) is obtained as a solvent to measure the ¹H NMR of the sample, where the chemical shift uses parts per million (ppm) as unit and the coupling constant (J) uses hertz (Hz) as unit.

As shown in the ¹H NMR spectrum, the characteristic peak of phenyl ring of the oligomer (2,6-dimethylphenylene ether) is observed at a position of 6.48 ppm; the characteristic peak of methyl of the oligomer (2,6-dimethylphenylene ether) is observed at a position of 2.10 ppm; and the characteristic peak of hydroxyl of the oligomer (2,6-dimethylphenylene ether) at a position of 4.55 ppm is disappeared, which proves that the hydroxyl terminal is reacted and the structure is correct. Through gel-permeation chromatography (GPC), the number-average molecular weight is identified as 3741 g/mol and the weight-average molecular weight as 5278 g/mol.

[Fabrication of Fluorine-Containing (2,6-dimethylphenylene ether) bisphenol-oligomer]

A fluorine-containing (2,6-dimethylphenylene ether) bisphenol-oligomer according to the present invention is obtained through the following steps, which is merely an exemplary description and is not intended to limit the present invention. The fluorine-containing (2,6-dimethylphenylene ether) oligomer obtained in State-of-use 1 is catalyzed with the alkaline catalyst to process reaction with dicyclopentadiene-2,6-bisphenol to obtain a fluorine-containing (2,6-dimethylphenylene ether) bisphenol-oligomer having the following formula:

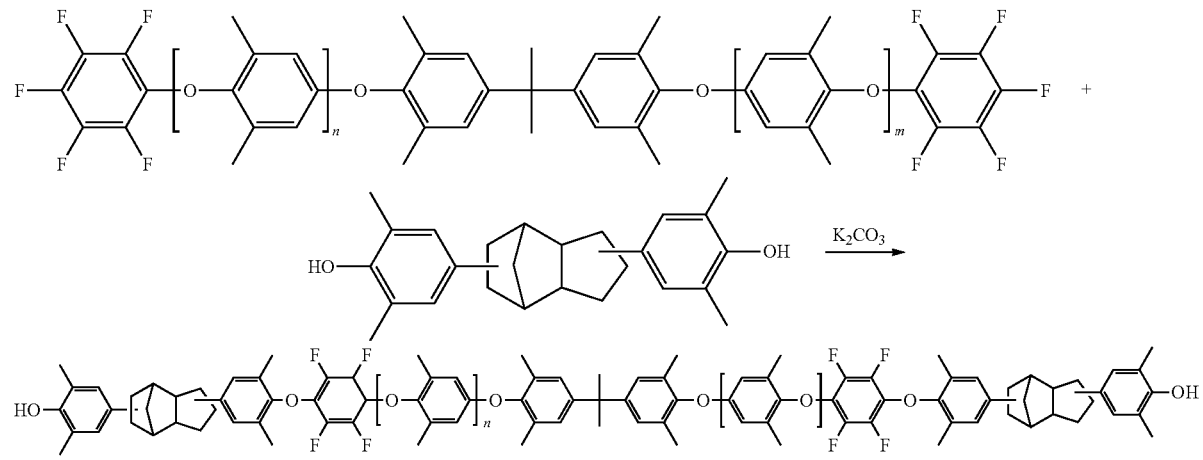

with n and m defined as described above as thus omitted here.

[State-of-Use 2] Synthesis of Fluorine-Containing (2,6-dimethylphenylene ether) bisphenol-oligomer In a 100-milliliter (ml) three-necked reactor, 2.34 g (1.553*4 mmol) of dicyclopentadiene-2,6-bisphenol, 0.47 g (3.125*5 mmol) of potassium carbonate, and 4 g (1.553*2.2 mmol) of dimethylformamide are added under a nitrogen atmosphere to be stirred for 30 minutes with a temperature raised up to 120° C. 3 g (1.553 mmol) of fluorine-containing (2,6-dimethylphenylene ether) oligomer of State-of-use 1 is further dissolved in 18 g of dimethylformamide and, then, is added dropwise to the three-necked reactor and maintained for reaction for 12 hrs at 120° C. After the reaction, it is cooled down to a room temperature. A mixture thus obtained is poured out into methanol water for precipitation and is washed several times with methanol water. At last, suction and filtration are processed to dry a filter cake under vacuum at 60° C. to obtain a white powdery product with a yield of 85% as shown in the following structure:

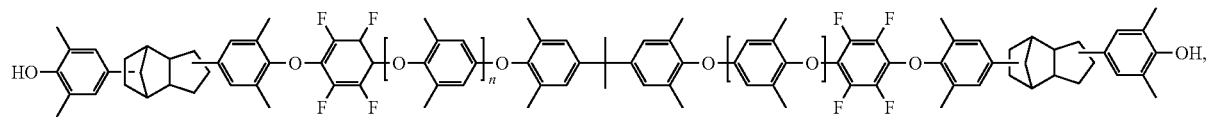

where each one of n and m is a separately independent integer of 0~300.

As shown in the ¹H NMR spectrum, the characteristic peak of phenyl ring of the oligomer (2,6-dimethylphenylene ether) is observed at a position of 6.48 ppm; and the characteristic peak of methyl of the oligomer (2,6-dimethylphenylene ether) is appeared at a position of 2.10 ppm with the characteristic peak of hydroxyl formed at a position of 4.55 ppm, which proves that the structure is correct. Through GPC, the number-average molecular weight is identified as 6069 g/mol and the weight-average molecular weight as 10393 g/mol.

[Fabrication of Oligomer (2,6-dimethylphenylene ether)]

An oligomer (2,6-dimethylphenylene ether) according to the present invention is obtained through the following steps, which is merely an exemplary description and is not intended to limit the present invention. The fluorine-containing (2,6-dimethylphenylene ether) bisphenol-oligomer of State-of-use 2 is terminal-functionalized. Acetic anhydride is added under an alkaline environment to obtain a first oligomer (2,6-dimethylphenylene ether), whose reaction is shown as follows:

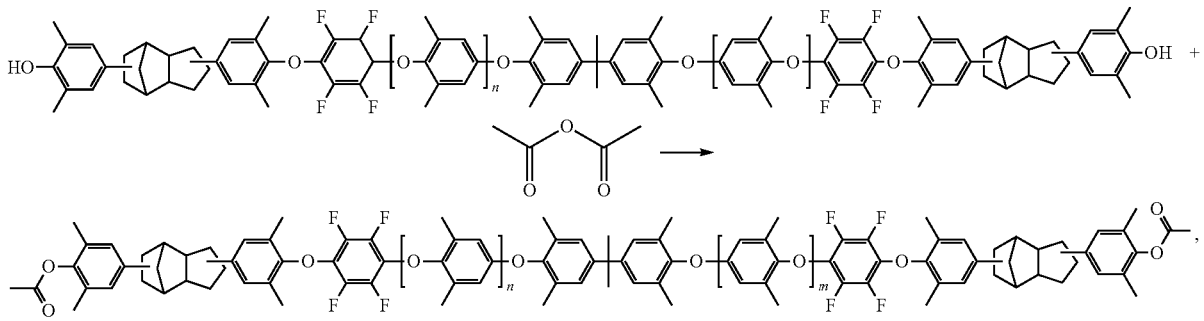

where the first oligomer (2,6-dimethylphenylene ether) is an oligomer containing an ester group with n and m defined as described above as thus omitted here.

The fluorine-containing (2,6-dimethylphenylene ether) bisphenol-oligomer of State-of-use 2 is terminal-functionalized. Methacrylic anhydride is added under an alkaline environment to obtain a second oligomer (2,6-dimethylphenylene ether), whose reaction is shown as follows:

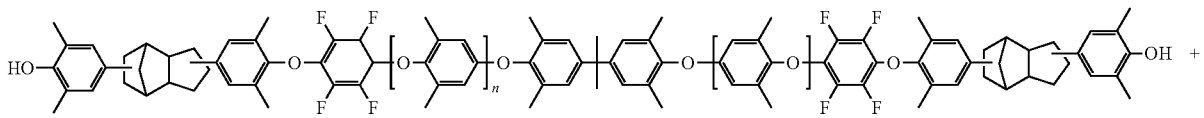

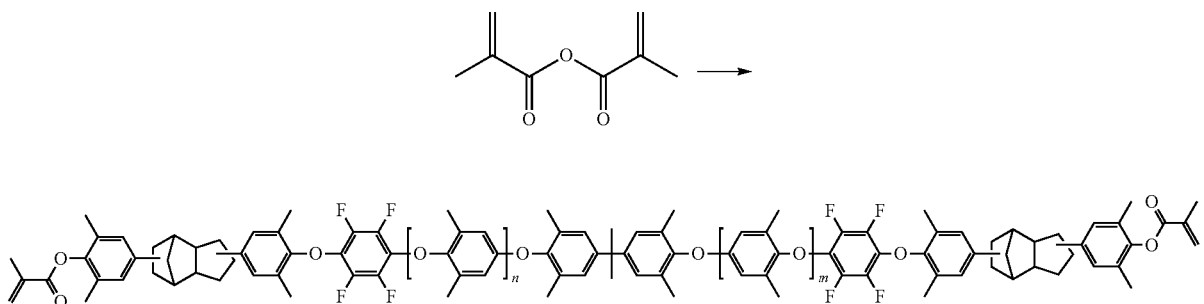

where the second oligomer (2,6-dimethylphenylene ether) is an oligomer containing an unsaturated group and is also an oligomer containing an ester group with n and m defined as described above as thus omitted here.

The fluorine-containing (2,6-dimethylphenylene) bisphenol-oligomer of State-of-use 2 is terminal-functionalized. 4-vinylbenzyl chloride is added under an alkaline environment to obtain a third oligomer (2,6-dimethylphenylene ether), whose reaction is shown as follows:

where the fourth oligomer (2,6-dimethylphenylene ether) is an oligomer having an unsaturated group and is also an oligomer containing an ester group with n and m defined as described above as thus omitted here.

[State-of-Use 3] Synthesis of First Oligomer (2,6-dimethylphenylene ether) (II-Act)

In a 100-milliliter (ml) three-necked reactor, 4 g (1.512 mmol) of fluorine-containing (2,6-dimethylphenylene ether) bisphenol-oligomer of State-of-use 2, 0.34 g (1.512*2.2

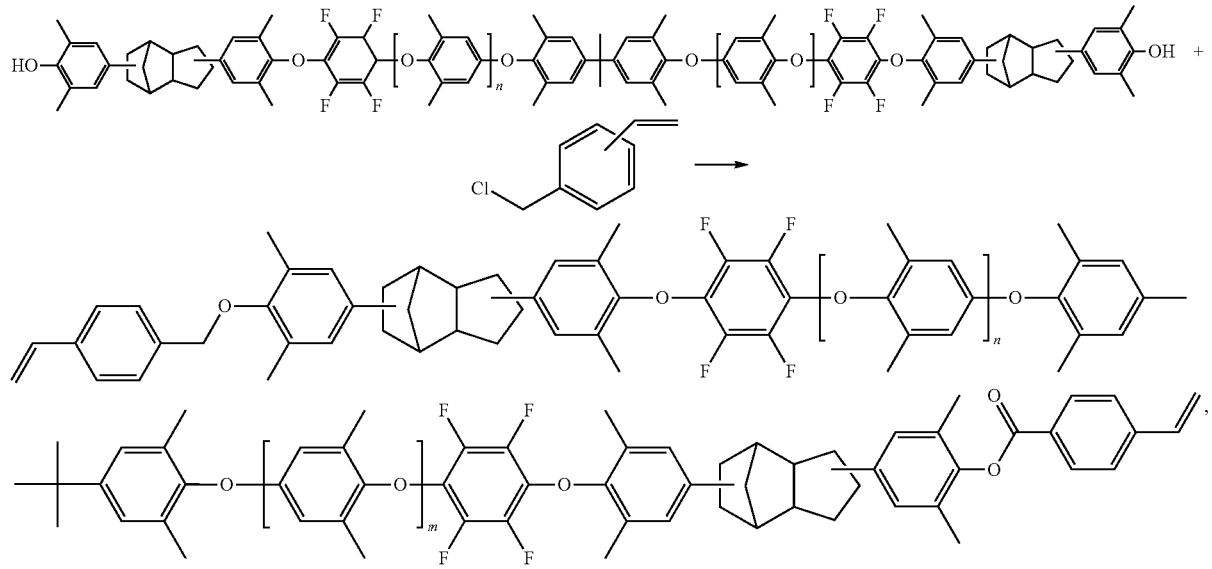

where the third oligomer (2,6-dimethylphenylene ether) is an oligomer containing an unsaturated group with n and m defined as described above as thus omitted here.

The fluorine-containing (2,6-dimethylphenylene ether) bisphenol-oligomer of State-of-use 2 is terminal-functionalized. 4-vinylbenzoic acid is added under an alkaline environment to obtain a fourth oligomer (2,6-dimethylphenylene ether), whose reaction is shown as follows:

mmol) of acetic anhydride, 0.08 g (2 wt % OPE-2DCPD) of 4-dimethylaminopyridine (DMAP), and 16 g of dimethylacetamide are added under a nitrogen atmosphere to be stirred for 12 hrs with a temperature raised up to 85° C. After the reaction, it is cooled down to a room temperature. A mixture thus obtained is poured out into methanol water for precipitation and is washed several times with methanol water. At last, suction and filtration are processed to dry a

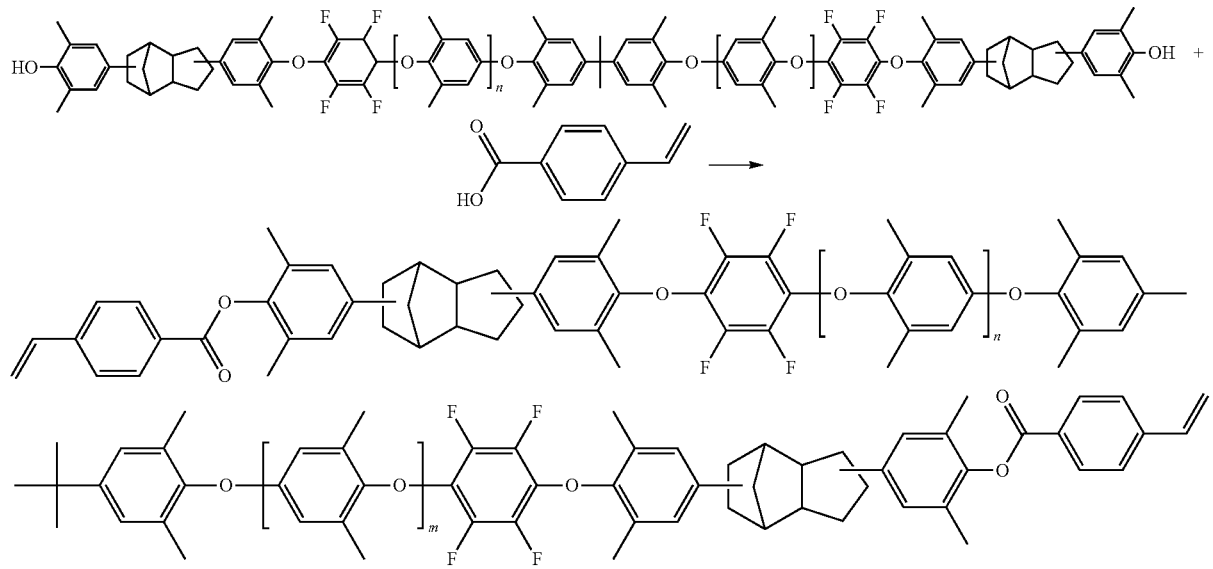

filter cake under vacuum at 60° C. to obtain a light brown powdery product as shown in the following structure:

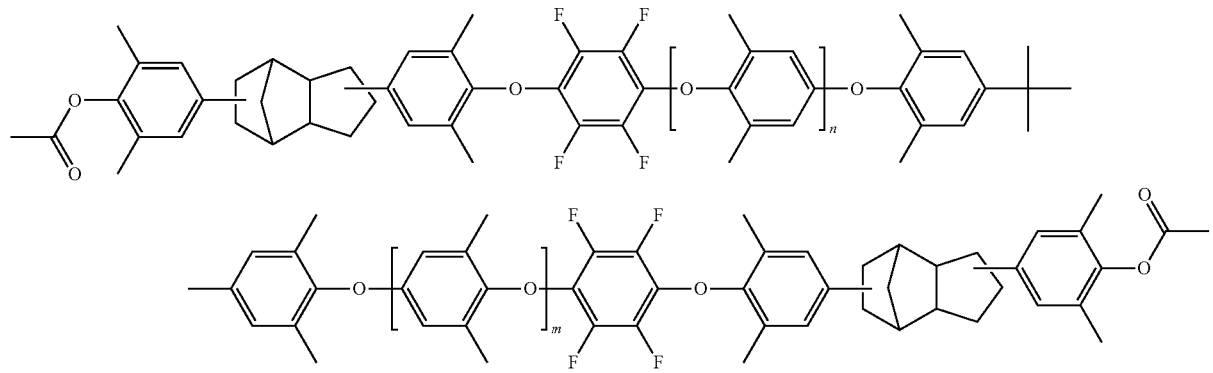

with a yield of 96%, where each one of n and m is a separately independent integer of 0~300.

As shown in the $^1$H NMR spectrum, the characteristic peak of phenyl ring of the first oligomer (2,6-dimethylphenylene ether) is observed at a position of 6.48 ppm; and the characteristic peak of methyl of the oligomer (2,6-dimethylphenylene ether) is appeared at a position of 2.10 ppm with the characteristic peak of hydroxyl disappeared at the position of 4.55 ppm along with a characteristic peak of methyl terminal group appeared at a position of 2.32 ppm, which proves that the structure is correct. Through GPC, the number-average molecular weight is identified as 6469 g/mol and the weight-average molecular weight as 11335 g/mol.

[State-of-Use 4] Synthesis of Second Oligomer (2,6-dimethylphenylene ether) (II-MMA)

In a 100-milliliter (ml) three-necked reactor, 4 g (1.512 mmol) of fluorine-containing (2,6-dimethylphenylene ether) bisphenol-oligomer of State-of-use 2, 0.93 g (1.512*4 mmol) of methacrylic anhydride, 0.08 g (2 wt % OPE-2DCPD) of DMAP, and 16 g of dimethylacetamide are added under a nitrogen atmosphere to be stirred for 12 hrs with a temperature raised up to 85° C. After the reaction, it is cooled down to a room temperature. A mixture thus obtained is poured out into methanol water for precipitation and is washed several times with methanol water. At last, suction and filtration are processed to dry a filter cake under vacuum at 60° C. to obtain a light brown powdery product as shown in the following structure:

with a yield of 93%, where each one of n and m is a separately independent integer of 0~300.

As shown in the $^1$H NMR spectrum, the characteristic peak of phenyl ring of the second oligomer (2,6-dimethylphenylene ether) is observed at a position of 6.48 ppm; and the characteristic peak of methyl of the oligomer (2,6-dimethylphenylene ether) is appeared at a position of 2.10 ppm with the characteristic peak of hydroxyl disappeared at the position of 4.55 ppm along with a characteristic peak of acrylic double-bond terminal group appeared at a position of 5.75 ppm, which proves that the structure is correct. Through GPC, the number-average molecular weight is identified as 6515 g/mol and the weight-average molecular weight as 11676 g/mol.

[State-of-Use 5] Synthesis of Third Oligomer (2,6-dimethylphenylene ether) (II-Sty)

In a 100-milliliter (ml) three-necked reactor, 4 g (1.512 mmol) of fluorine-containing (2,6-dimethylphenylene ether) bisphenol-oligomer of State-of-use 2, 0.92 g (1.512*4 mmol) of 4-vinylbenzyl chloride, 0.46 g (1.512*2.2 mmol) of potassium carbonate, and 16 g of dimethylacetamide are added under a nitrogen atmosphere to be stirred for 12 hrs with a temperature raised up to 100° C. After the reaction, it is cooled down to a room temperature. A mixture thus obtained is poured out into methanol water for precipitation and is washed several times with methanol water. At last, suction and filtration are processed to dry a filter cake under vacuum at 60° C. to obtain a light brown powdery product as shown in the following structure:

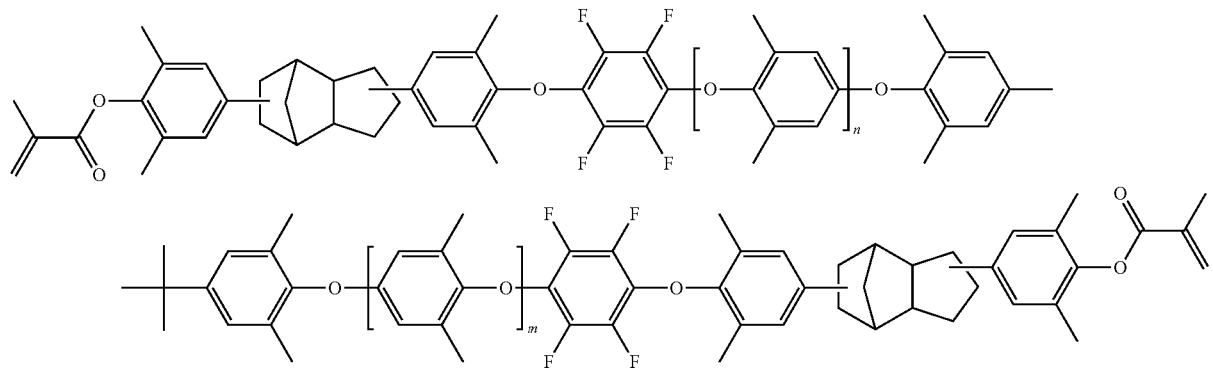

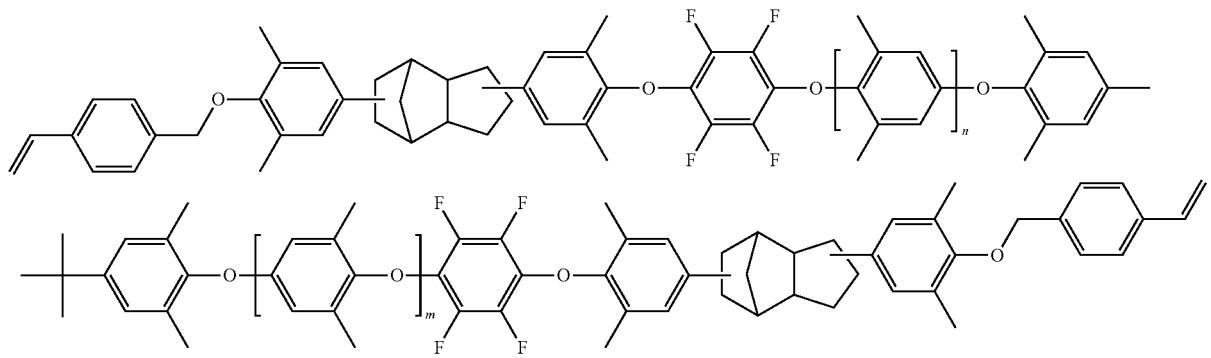

with a yield of 91%, where each one of n and m is a separately independent integer of 0~300.

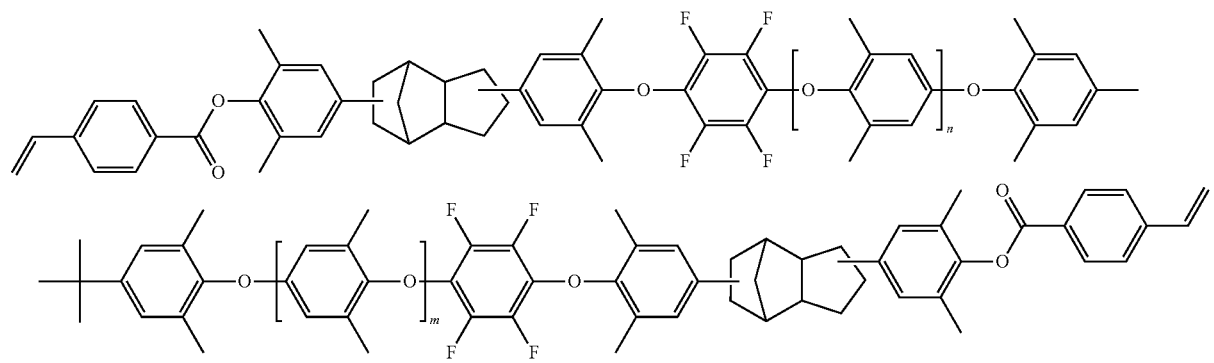

As shown in the $^1$H NMR spectrum, the characteristic peak of phenyl ring of the third oligomer (2,6-dimethylphenylene ether) is observed at a position of 6.48 ppm; and the characteristic peak of methyl of the oligomer (2,6-dimethylphenylene ether) is appeared at a position of 2.10 ppm with the characteristic peak of hydroxyl disappeared at the position of 4.55 ppm along with characteristic peaks of styrene double-bond terminal group appeared at positions of 5.77 ppm and 5.26 ppm, which proves that the structure is correct. Through GPC, the number-average molecular weight is identified as 6747 g/mol and the weight-average molecular weight as 11941 g/mol.

[State-of-Use 6] Synthesis of Fourth Oligomer (2,6-dimethylphenylene ether) (II-E-Sty)

In a 100-milliliter (ml) three-necked reactor, 0.493 g (1.512*2.2 mmol) of 4-vinylbenzoic acid, 0.69 g (1.512*2.2 mmol) of N,N'-dicyclohexyl carbodiimide, 0.185 g (1.512 mmol) of DMAP, and 15 milliliters (ml) of methylene chloride are added under a nitrogen atmosphere to be stirred for 30 minutes with a temperature cooled down to 0° C. 4 g (1.512 mmol) of fluorine-containing (2,6-dimethylphenylene ether) bisphenol-oligomer of State-of-use 2 is further dissolved in 30 ml of dichloromethane to be added dropwise to the three-necked reactor and maintained for the reaction for 2 hrs. The ice bath is then removed for the reaction at a room temperature for 12 hrs. After the reaction, suction and filtration are processed to remove most of the intermediate dicyclohexylurea generated during the reaction. A filtrate thus obtained is poured out into methanol water for precipitation and is washed several times with methanol water. At last, suction and filtration are processed to dry a filter cake under vacuum at 60° C. to obtain a light brown powdery product as shown in the following structure:

with a yield of 92%, where each one of n and m is a separately independent integer of 0~300.

As shown in the $^1$H NMR spectrum, the characteristic peak of phenyl ring of the fourth oligomer (2,6-dimethylphenylene ether) is observed at a position of 6.48 ppm; and the characteristic peak of methyl of the oligomer (2,6-dimethylphenylene ether) is appeared at a position of 2.10 ppm with the characteristic peak of hydroxyl disappeared at the position of 4.55 ppm, which proves hydroxyl terminal is successfully esterified. Characteristic peaks of styrene double-bond terminal are separately appeared at positions of 5.91 ppm and 5.43 ppm; characteristic peaks of phenyl ring of styrene terminal are separately appeared the chemical shift at 7.55 ppm and 8.20 ppm; and characteristic peaks of carboxylic acid is not found on the spectrum, which proves that the structure is correct. Through GPC, the number-average molecular weight is identified as 6818 g/mol and the weight-average molecular weight as 12368 g/mol.

[Fabrication of Cured Product]

A cured product according to the present invention is obtained through the following steps, which is merely an exemplary description and is not intended to limit the present invention. The oligomer containing unsaturated terminal (i.e. the second oligomer (2,6-dimethylphenylene ether), the third oligomer (2,6-dimethylphenylene ether), or the fourth oligomer (2,6-dimethylphenylene ether)) uses a peroxide as an initiator to process a reaction of unsaturated group; or, the oligomer containing ester-group terminal (i.e. the first oligomer (2,6-dimethylphenylene ether), the second oligomer (2,6-dimethylphenylene ether), or the fourth oligomer (2,6-dimethylphenylene ether)) is copolymerized with an epoxy resin to obtain a cured product having a low dielectric constant, a low dielectric loss, and a high glass-transition temperature.

[State-of-Use 7] Fabrication of Self-Crosslinking Cured Product with Oligomer (2,6-dimethylphenylene ether)

The second oligomer (2,6-dimethylphenylene ether) of State-of-use 4, the third oligomer (2,6-dimethylphenylene ether) of State-of-use 5, or the fourth oligomer (2,6-dimethylphenylene ether) of State-of-use 6 is obtained to process self-crosslinking. The second oligomer (2,6-dimethylphenylene ether), the third oligomer (2,6-dimethylphenylene ether), or the fourth oligomer (2,6-dimethylphenylene ether)) is added with tert-butyl cumyl peroxide (TBCP) as a radical initiator to configure a solution having a 10% solid content by using dimethylacetamide as solvent. Therein, the content of t-butyl cumyl peroxide occupies 1 wt % of the second oligomer (2,6-dimethylphenylene ether), the third oligomer (2,6-dimethylphenylene ether), or the fourth oligomer (2,6-dimethylphenylene ether). After being mixed uniformly, the solution is poured out into a mold to be heat-cured under a nitrogen atmosphere, whose conditions include 80° C. for 12 hrs, 120° C. for 2 hrs, 180° C. for 2 hrs, 200° C. for 2 hrs, and 220° C. for 2 hrs. After releasing the mold, a dark-brown cured product is obtained, i.e. a cured product of State-of-use 7-1 (obtained through self-crosslinking of the second oligomer (2,6-dimethylphenylene ether) of State-of-use 4,) a cured product of State-of-use 7-2 (obtained through self-crosslinking of the third oligomer (2,6-dimethylphenylene ether) of State-of-use 5,) or a cured product of State-of-use 7-3 (obtained through self-crosslinking of the fourth oligomer (2,6-dimethylphenylene ether) of State-of-use 6).

[State-of-Use 8] Fabrication of Cured Product by Copolymerizing Oligomer (2,6-dimethylphenylene ether) with Epoxy Resin The first oligomer (2,6-dimethylphenylene ether) of State-of-use 3, the second oligomer (2,6-dimethylphenylene ether) of State-of-use 4, or the fourth oligomer (2,6-dimethylphenylene ether) of State-of-use 6 is cured with a commercially available epoxy resin HP-7200 (DIC Corp.) The epoxy resin along with the first oligomer (2,6-dimethylphenylene ether), the second oligomer (2,6-dimethylphenylene ether), or the fourth oligomer (2,6-dimethylphenylene ether) has an equivalent ratio of 1:1 to be added with TBCP as a radical initiator (i.e. double-bond initiator) and DMAP as a cross-linking accelerator (i.e. epoxy ring-opening agent) for configuring a solution having a 10% solid content through dimethylacetamide. Therein, the content of t-butyl cumyl peroxide occupies 1 wt % of the first oligomer (2,6-dimethylphenylene ether), the second oligomer (2,6-dimethylphenylene ether), or the fourth oligomer (2,6-dimethylphenylene ether); and the content of DMAP occupies 0.5 wt % of the epoxy resin. After being mixed uniformly, the solution is poured out into a mold to be heat-cured under a nitrogen atmosphere, whose conditions include 80° C. for 12 hrs, 120° C. for 2 hrs, 180° C. for 2 hrs, 200° C. for 2 hrs, and 220° C. for 2 hrs. After releasing the mold, a dark-brown cured product is obtained, i.e. a cured product of State-of-use 8-1 (obtained through copolymerizing the first oligomer (2,6-dimethylphenylene ether) of State-of-use 3 with the epoxy resin,) a cured product of State-of-use 8-2 (obtained through copolymerizing the second oligomer (2,6-dimethylphenylene ether) of State-of-use 4 with the epoxy resin,) or a cured product of State-of-use 8-3 (obtained through copolymerizing the fourth oligomer (2,6-dimethylphenylene ether) of State-of-use 6 with the epoxy resin.)

[Comparative Product 1] Fabrication of Self-Crosslinking Cured Product with Commercially Available Oligomer (2,6-dimethylphenylene ether)

According to the fabrication steps of State-of-use 7, a (2,6-dimethylphenylene ether) oligomer of commercially available SA9000 having acrylic terminal and a (2,6-dimethylphenylene ether) oligomer of commercially available OPE-2ST having styrene terminal are separately obtained to process self-crosslinking. After releasing the mold, dark-brown cured products are obtained, i.e. a cured product of Comparative product 1-1 (obtained through self-crosslinking of SA9000):

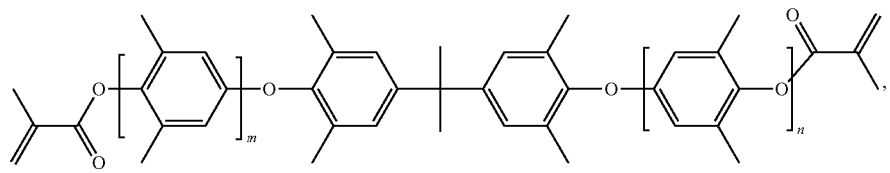

SA9000 and a cured product of Comparative product 1-2 (obtained through self-crosslinking of OPE-2ST):

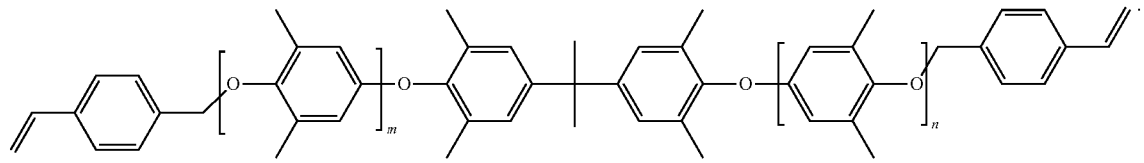

OPE-2St

[Comparative Product 1] Fabrication of Cured Product by Copolymerizing Commercially Available Oligomer (2,6-dimethylphenylene ether) with Epoxy Resin According to the fabrication steps of State-of-use 8, a (2,6-dimethylphenylene ether) oligomer of commercially available SA9000 having acrylic terminal and a commercially available epoxy resin (HP-7200, DIC Corp., Japan) are copolymerized and cured. After releasing the mold, a dark-brown cured product is obtained (Comparative product 2.)

[Analysis of Molecular Weight and Solubility of Oligomer (2,6-dimethylphenylene ether)]

The test results of molecular weight and solubility for State-of-use 1 to State-of-use 6 are summarized to be shown in FIG. 1 and FIG. 5.

Please refer to FIG. 1, molecular weight is measured through GPC (Brand and Model: Hitachi L2400) with a column constant-temperature of 40° C. and a flow rate of 1.0 milliliter per minute (mL/min.). Then, a test sample is dissolved in N-methylpyrrolidone (1-methyl-2-pyrrolidone, NMP) at a ratio of 1:99. After being filtered with a filter head of 0.22 micrometers (μm), 25 microliters of the solution is injected into the device to obtain a number-average molecular weight (Mn), a weight-average molecular weight (Mw), and a polydispersity index (PDI) to be recorded as shown in FIG. 3.

According to the result shown in FIG. 3, the number-average molecular weights of State-of-use 1 to State-of-use 6 are all smaller than 7000 and the polydispersity indexes (PDI) are all smaller than 2, which shows that the synthesis method according to the present invention effectively controls the molecular weight of the product and further avoids generating high-molecular-weight polymers. In addition, in the test of solubility, all of State-of-use 1 to State-of-use 6 can be completely dissolved in toluene and butanone, which shows excellent organic solubility.

[Physical-Property Analysis of Cured Product]

1. Thermal-Property Analysis of Cured Product

FIG. 4 shows the result summary of thermal features of Comparative product 1-1, Comparative product 1-2, Comparative product 2, State-of-use 7-1, State-of-use 7-2, State-of-use 7-3, State-of-use 8-1, State-of-use 8-2, and State-of-use 8-3.

In the present invention, the thermal features are evaluated as follows:

(1) A dynamic mechanical analyzer (DMA) (Brand and Model: Perkin-Elmer Pyris Diamond) is used to measure viscoelastic property and glass-transition temperature (Tg) of test material. Film samples are cut to a size of 2.0 centimeters (cm)×1.0 cm, which are processed with a use method of tension, a heating rate of 5° C. per minute (° C./min), a frequency of 1 hertz (Hz), an amplitude of 25 μm, and a temperature range of 40-350° C. to determine a storage modulus and a Tan δ curve and obtain the glass-transition temperature (Tg).

(2) A thermo-mechanical analyzer (TMA) (Brand and Model: SII TMA/SS6100) is used to measure the glass-transition temperature (Tg) and a thermal-expansion coefficient (CTE). The samples are deposed in the device to measure the lengths (of films,) which films are processed with a configuration of tension, a heating rate of 5° C./min, and a measuring range of CTE of 50-150° C.

(3) A thermo-gravimetric analyzer (TGA) (Brand and Model: PerkinElmer Pyris 1 TGA) is used to measure a 5% thermogravimetric loss temperature (Td5%) and a char yield at 800° C. (CY, %). 3~5 milligrams (mg) of each of the samples is deposed in a platinum pan. Nitrogen (or air) flows in. The temperature is heated up at a rate of 20° C./min from 40° C. to 800° C. for solving out thermal-decomposition temperatures through thermal decomposition curves; and for obtaining residual-weight percentage, i.e. char yields at 800° C. Therein, the 5% thermogravimetric loss temperature is the temperature when the weight loss reaches 5%, where a higher 5% thermogravimetric loss temperature means a better thermostability; and the char yield at 800° C. is the sample residue weight percentage for a temperature being heated up to 800° C., where a higher char yield at 800° C. means a better thermostability.

As shown in FIG. 4, self-crosslinking cured products are summarized, including a cured product of Comparative product 1-1, a cured product of Comparative product 1-2, a cured product of State-of-use 7-1, a cured product of State-of-use 7-2, and a cured product of State-of-use 7-3. According to the result shown in FIG. 4, the glass-transition temperatures measured based on DMA for the cured product of State-of-use 7-1, the cured product of State-of-use 7-2, and the cured product of State-of-use 7-3 all reach a temperature higher than 230° C., while the glass-transition temperatures for the cured products of Comparative product 1-1 and Comparative product 1-2 are separately 235° C. and 229° C. Then, the thermostability analyzed based on TGA is compared with the 5% thermogravimetric loss temperature (457° C.) and the char yield (20%) of the cured product of Comparative product 1-1 and the 5% thermogravimetric loss temperature (395° C.) and the char yield (27%) of the cured product of Comparative product 1-2, the 5% thermogravimetric loss temperature (473° C.) and the char yield (42%) of the cured product of State-of-use 7-1, the 5% thermogravimetric loss temperature (439° C.) and the char yield (45%) of the cured product of State-of-use 7-2, and the 5% thermogravimetric loss temperature (453° C.) and the char yield (46%) of the cured product of State-of-use 7-3, where all results show close to good or better thermostability.

With further reference to FIG. 4, copolymerized cured products are shown, including the cured product of Comparative product 2, the cured product of State-of-use 8-1, the cured product of State-of-use 8-2, and the cured product of State-of-use 8-3. As shown in FIG. 4, DMA is used to measure the cured product of State-of-use 8-1, the cured product of State-of-use 8-2, and the cured product of State-of-use 8-3, where only a single peak is observed in Tan δ to identify a single phase for the copolymer of the epoxy resin and the oligomer (2,6-dimethylphenylene ether) having ester-group terminal; and the cured product of State-of-use 8-1, the cured product of State-of-use 8-2, and the cured product of State-of-use 8-3 separately have glass-transition temperatures of 197° C., 218° C., and 222° C., which shows that the introduction of acrylic double bond and styrene double bond effectively enhances the thermal features of the cured products. Then, the thermostability analyzed based on TGA is compared with the 5% thermogravimetric loss temperature (433° C.) and the char yield (16%) of the cured product of Comparative product 2, the 5% thermogravimetric loss temperature (425° C.) and the char yield (32%) of the cured product of State-of-use 8-1, the 5% thermogravimetric loss temperature (440° C.) and the char yield (33%) of the cured product of State-of-use 8-2, and the 5% thermogravimetric loss temperature (435° C.) and the char yield (39%) of the cured product of State-of-use 8-3, where all results show close to or better than good thermostability.

From the summarized thermal analysis result shown in FIG. 4, it is known that, with the introduction of fluorine and dicyclopentadiene into the oligomer (2,6-dimethylphenylene ether) according to the present invention, the fluorine-containing structure having the free volume increased and C—F bond lower polarity further enhances the dielectric features of the self-crosslinking cured products and the copolymerized cured products for obtaining better thermostability.

2. Water-Absorption Analysis of Cured Product

Figure 2:
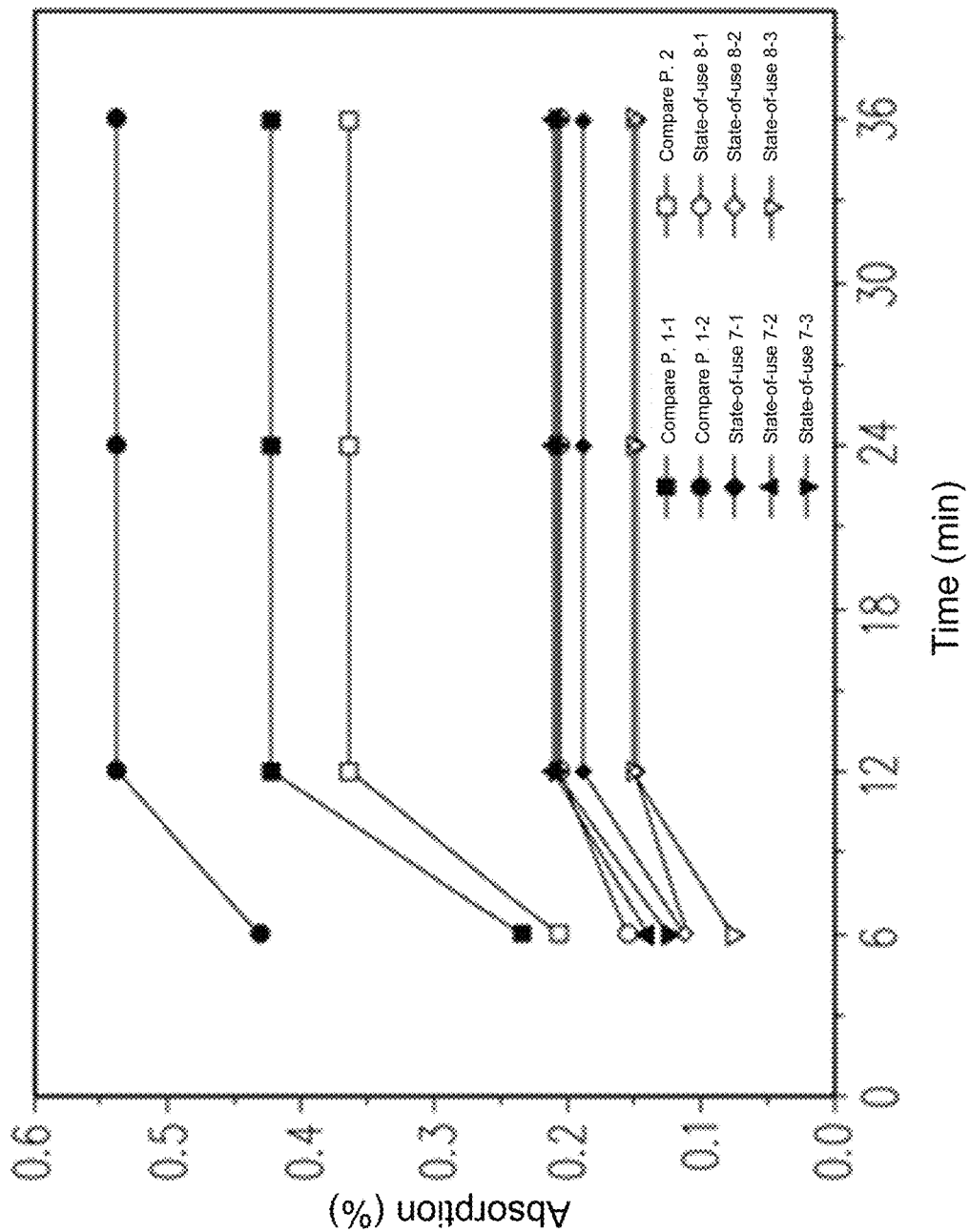
FIG. 2 is the view showing the water absorption rates of the cured products and the comparative products.

FIG. 2 shows the water-absorption ratios of Comparative product 1-1, Comparative product 1-2, Comparative product 2, State-of-use 7-1, State-of-use 7-2, State-of-use 7-3, State-of-use 8-1, State-of-use 8-2, and State-of-use 8-3.

In the present invention, water absorption capacity is evaluated with 200 mg of each of the cured product of Comparative product 1-1, the cured product of Comparative product 1-2, the cured product of Comparative product 2, the cured product of State-of-use 7-1, the cured product of State-of-use 7-2, the cured product of State-of-use 7-3, the cured product of State-of-use 8-1, the cured product of State-of-use 8-2, and the cured product of State-of-use 8-3 to be separately deposed in 80° C. hot water and measure their water absorption ratios over time.

Please refer to FIG. 2, self-crosslinking cured products are shown, including the cured product of Comparative product 1-1, the cured product of Comparative product 1-2, the cured product of State-of-use 7-1, the cured product of State-of-use 7-2, and the cured product of State-of-use 7-3. As shown in FIG. 2, when the structures of fluorine and dicyclopentadiene are introduced to the oligomer (2,6-dimethylphenylene ether) (State-of-use 7-1, State-of-use 7-2, and State-of-use 7-3), the water-absorption ratios obtained after being saturated are all smaller than 0.25%, which is significantly lower than the water-absorption ratios of Comparative product 1-1 and Comparative product 1-2. The result confirms that the introduction of hydrophobic material, like fluorine and dicyclopentadiene, according to the present embodiment accomplishes the reduction of water absorption; and, after dicyclopentadiene is crosslinked with unsaturated double bond, hydrophobicity is further enhanced.

With further reference to FIG. 2, copolymerized cured products are shown, including the cured product of Comparative product 2, the cured product of State-of-use 8-1, the cured product of State-of-use 8-2, and the cured product of State-of-use 8-3, where State-of-use 8-1, State-of-use 8-2, and State-of-use 8-3 all have water absorption ratios lower than the Comparative product 2. Nevertheless, as compared to the self-crosslinking cured products, the copolymerized cured products (State-of-use 8-2 and State-of-use 8-3) obtained through being cured with the epoxy resin of HP7200 have the lowest saturated water absorptions of 0.15%, which is because that epoxy resin also has a structure of dicyclopentadiene for obtaining the lower water absorption.

3. Electrical Property Analysis of Cured Product

FIG. 5 summarizes the electrical features of Comparative product 1-1, Comparative product 1-2, Comparative product 2, State-of-use 7-1, State-of-use 7-2, State-of-use 7-3, State-of-use 8-1, State-of-use 8-2, and State-of-use 8-3.

In the present invention, the electrical features are evaluated as follows: (1) A device of dielectric constant analysis (Brand and Model: Rohde & Schwarz, Taiwan) is used to measure a dielectric constant and a dielectric loss of cured product under 10 giga-hertz (GHz): Samples are obtained by cutting a film to pieces of a size of 9 cm×13 cm for measuring under an environment of a constant temperature. (2) An impedance analyzer (Brand and Model: Keysight E4991A) is used to measure a dielectric constant and a dielectric loss of a sample under 1 GHz: A film of 200~400 μm is put into a metal cavity for measuring after being firmly and seamlessly pressed.

Please refer to FIG. 5, self-crosslinking cured products are shown, including the cured product of Comparative product 1-1, the cured product of Comparative product 1-2, the cured product of State-of-use 7-1, the cured product of State-of-use 7-2, and the cured product of State-of-use 7-3. As shown in FIG. 5, as compared with a dielectric constant of 2.70 U (10 GHz) of the cured product of Comparative product 1-1 and a dielectric constant of 2.69 U (1 GHz) of the cured product of Comparative product 1-2, a dielectric constant of 2.46 U (10 GHz) of the cured product of State-of-use 7-1, a dielectric constant of 2.57 U (10 GHz) of the cured product of State-of-use 7-2, and a dielectric constant of 2.62 U (10 GHz) of the cured product of State-of-use 7-3 show lower dielectric constants. Regarding the comparison of dielectric losses, as compared with a dielectric loss of 3.1 mU (10 GHz) of the cured product of Comparative product 1-1 and a dielectric loss of 6.9 mU (1 GHz) of the cured product of Comparative product 1-2, a dielectric loss of 2.3 mU (10 GHz) of the cured product of State-of-use 7-1, a dielectric loss of 5.6 mU (10 GHz) of the cured product of State-of-use 7-2, and a dielectric loss of 2.9 mU (10 GHz) of the cured product of State-of-use 7-3 are obtained. Thus, as is described above, the self-crosslinking cured products according to the present invention have lower dielectric constants and excellent electrical features.

With further reference to FIG. 5, the copolymerized cured products in FIG. 5 are the cured product of Comparative product 2, the cured product of State-of-use 8-1, the cured product of State-of-use 8-2, and the cured product of State-of-use 8-3. As shown in FIG. 5, as compared with a dielectric constant of 2.75 U (10 GHz) of the cured product of Comparative product 2, a dielectric constant of 2.59 U (1 GHz) of the cured product of State-of-use 8-1, a dielectric constant of 2.48 U (10 GHz) of the cured product of State-of-use 8-2, and a dielectric constant of 2.67 U (10 GHz) of the cured product of State-of-use 8-3 show lower dielectric constants. Regarding the comparison of dielectric loss, as compared with a dielectric loss of 8.0 mU (10 GHz) of the cured product of Comparative product 2, a dielectric loss of 8.2 mU (1 GHz) of the cured product of State-of-use 8-1, a dielectric loss of 9.2 mU (10 GHz) of the cured product of State-of-use 8-2, and a dielectric loss of 9.3 mU (10 GHz) of the cured product of State-of-use 8-3 are shown. Therein, because of the lack of double bonds, the crosslink density of State-of-use 8-1 decreases, where curing a bigger film is not possible for measuring the dielectric features and losses under 10 GHz, yet possible under 1 GHz. Besides, as compared with the dielectric constants of the self-crosslinking cured products according to the present invention, the dielectric constants of the copolymerized cured products according to the present invention have dielectric constants slightly increased, which is owing to the reduction of the oligomer (2,6-dimethylphenylene ether) of the copolymerized cured products.

From the summarized result of electrical properties analysis shown in FIG. 5, it is known that, with the introduction of fluorine and dicyclopentadiene into oligomer (2,6-dimethylphenylene ether) according to the present invention, dielectric constant is effectively reduced after crosslinking dicyclopentadiene structure with unsaturated double bond, where free volume is increased with the fluorine-containing structure together with lower polarity of C—F bond for aiding in reducing dielectric constant. Hence, the self-crosslinking cured products and copolymerized cured products according to the present invention have lower dielectric constants and more excellent electrical features than commercially available products.

4. Flame Retardance Analysis of Cured Products

FIG. 6 summarizes the analysis results of flame retardance of Comparative product 1-1, Comparative product 1-2, Comparative product 2, State-of-use 7-1, State-of-use 7-2, State-of-use 7-3, State-of-use 8-1, State-of-use 8-2, and State-of-use 8-3.

In the present invention, flame retardancy measurement (UL-94 flame retardant test) is processed as follows: A sample is prepared at first, where a film having a size of 8 inches (in.)×2 in. winds a cylindrical support having a diameter of 0.5 in. and the support moves to be winded by 5 in. of the film with the part of the film un-winded to be stretched into a conical shape on the support to complete the preparation of the sample. Then, the prepared sample is burned by a flame source for the first time for 3 seconds (sec), after which the flame source is moved away with the burning time of the sample recorded as t1. Afterwards, the sample is waited for being cooled down for processing a second burning with the same burning time of 3 sec., after which the flame source is moved away with the burning time of the sample recorded as t2. During the above burnings, cotton is put at a position 12 in. below the sample for observing if dripping happens. Five pieces of the samples are obtained to repeat the test with t1 and t2 recorded. When the test results show average values of t1+t2 between 10 sec and 30 sec and the total time of t1+t2 of the five pieces of the sample is not longer than 50 sec without any dripping observed, the sample is rated as the level of UL-94 VTM-0. When the test results show average values of t1+t2 between 10 sec and 30 sec without any dripping observed, the sample is rated as the level of UL-94 VTM-1.

Please refer to FIG. 6, the self-crosslinking cured products are summarized, including the cured product of Comparative product 1-1, the cured product of Comparative product 1-2, the cured product of State-of-use 7-1, the cured product of State-of-use 7-2, and the cured product of State-of-use 7-3. The copolymerized cured products are shown, including the cured product of Comparative product 2, the cured product of State-of-use 8-1, the cured product of State-of-use 8-2, and the cured product of State-of-use 8-3. As shown in the test results of UL-94 flame retardancy, with the introduction of fluorine and dicyclopentadiene structure into oligomer (2,6-dimethylphenylene ether) according to the present invention, the fluorine-containing structure makes the cured product of State-of-use 7-1, the cured product of State-of-use 7-2, the cured product of State-of-use 7-3, the cured product of State-of-use 8-1, the cured product of State-of-use 8-2, and the cured product of State-of-use 8-3 all obtain flame retardancy while achieving the level of VTM V-0 in the UL-94 tests. Thus, in subsequent uses of the cured products, additional fire retardant is not required with excellent electrical features maintained simultaneously.

To sum up, the present invention is an oligomer (2,6-dimethylphenylene ether) together with a fabrication method and a cured product thereof, where the oligomer (2,6-dimethylphenylene ether) has a small molecular weight with excellent organic solubility obtained; and, furthermore, the cured products of the oligomer (2,6-dimethylphenylene ether) are characterized in a high glass-transition temperature, low water absorption, a low dielectric constant, excellent electrical features, good thermal stability, and good flame retardancy.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

The invention claimed is:

1. An oligomer (2,6-dimethylphenylene ether), having the following structure:

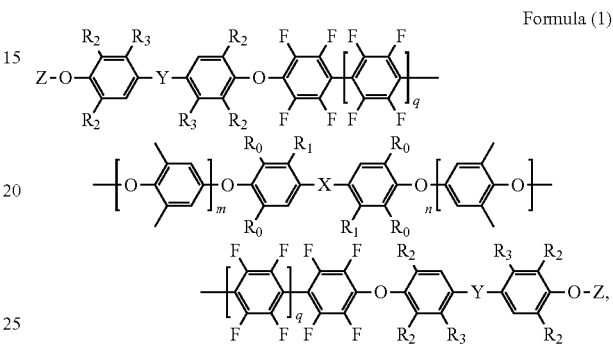

Formula (1)

wherein each one of $R_0$, $R_1$, $R_2$, and $R_3$ is separately independent and selected from a group consisting of hydrogen, C1-C6 alkyl, and phenyl; each one of n and m is a separately independent integer of 1~300; q is an integer selected from a group consisting of 0 and 1; each one of X and Y is separately independent and selected from a group consisting of —NR—, —CO—, —SO—, —CS—, —SO$_2$—, —CH$_2$—, —O—, null, —C(CH$_3$)$_2$—, and

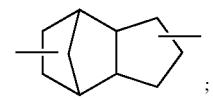

;

and Z is selected from a group consisting of hydrogen,

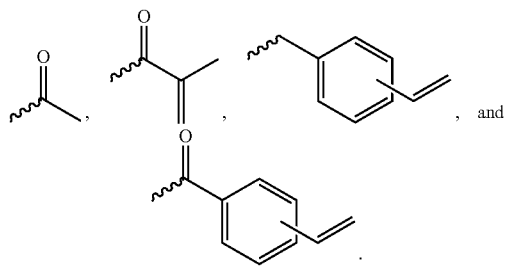

, and

2. The oligomer according to claim 1, wherein the oligomer is a material to obtain a board selected from a group consisting of a substrate board, a copper clad laminate, and a printed circuit board.

3. The oligomer according to claim 1, wherein the oligomer has a fabrication method, comprising the following steps:
(a) a (2,6-dimethylphenylene ether) oligomer having phenol terminal shown with Formula (2):

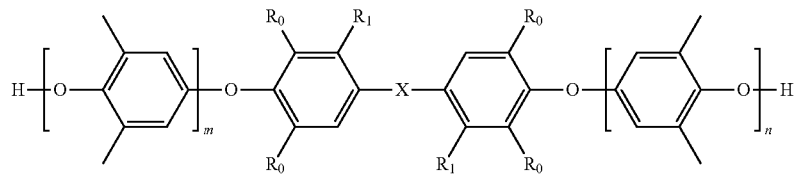

is catalyzed with an alkaline catalyst to process reaction with a component, selected from a group consisting of hexafluorobenzene and decafluorobiphenyl, shown with Formula (3):

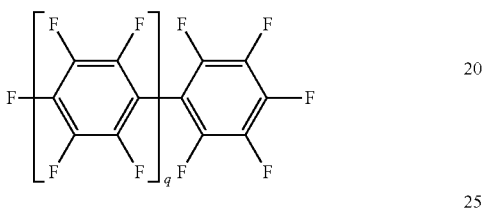

to obtain a fluorine-containing (2,6-dimethylphenylene ether) oligomer shown with Formula (4):

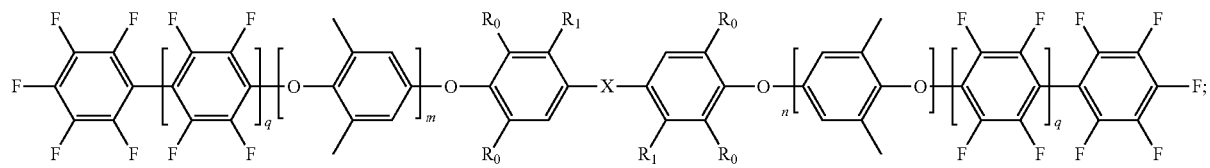

(b) said fluorine-containing (2,6-dimethylphenylene ether) oligomer is catalyzed with said alkaline catalyst to process reaction with a bisphenol to obtain a fluorine-containing (2,6-dimethylphenylene ether) bisphenol-oligomer shown with Formula (5):

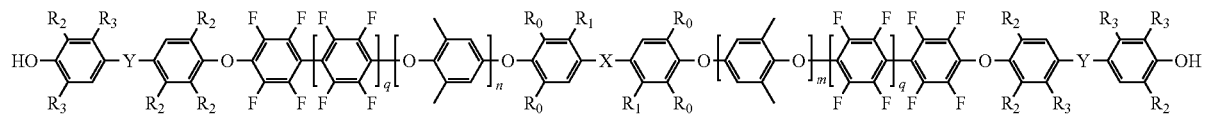

and
(c) the oligomer is obtained through a process selected from a group consisting of:
  (i) said fluorine-containing (2,6-dimethylphenylene ether) bisphenol-oligomer is catalyzed with a catalyst, selected from a group consisting of tertiary nitrogen catalyst and said alkaline catalyst, to process reaction with acetic anhydride to obtain a first oligomer (2,6-dimethylphenylene ether);
  (ii) said fluorine-containing (2,6-dimethylphenylene ether) bisphenol-oligomer is catalyzed with a catalyst, selected from a group consisting of said tertiary nitrogen catalyst and said alkaline catalyst, to process reaction with methyl acrylic anhydride to obtain a second oligomer (2,6-dimethylphenylene ether);
  (iii) said fluorine-containing (2,6-dimethylphenylene ether) bisphenol-oligomer is catalyzed with said alkaline catalyst to process reaction with halomethylstyrene to obtain a third oligomer (2,6-dimethylphenylene ether); and
  (iv) said fluorine-containing (2,6-dimethylphenylene ether) bisphenol-oligomer is catalyzed with a coupling reagent and an acyl transfer agent to process reaction with vinylbenzoic acid to obtain a fourth oligomer (2,6-dimethylphenylene ether),
wherein said oligomer (2,6-dimethylphenylene ether) has said structure shown with Formula (1) and is selected from a group consisting of said first oligomer (2,6-dimethylphenylene ether), said second oligomer (2,6-dimethylphenylene ether), said third oligomer (2,6-dimethylphenylene ether), and said fourth oligomer (2,6-dimethylphenylene ether).

4. The oligomer according to claim 3,
wherein said alkaline catalyst is selected from a group consisting of potassium carbonate, sodium carbonate, potassium hydroxide, sodium hydroxide, sodium bicarbonate, sodium acetate, and a combination of at least two of the above.

5. The oligomer according to claim 3,
wherein said bisphenol is selected from a group consisting of dicyclopentadiene-2,6-bisphenol; dicyclopentadiene-bisphenol; 3,3',5,5'-tetramethyl biphenyl-4,4'-diol; tetramethyl bisphenol A; 4,4'-biphenol; bisphenol A; tetramethyl bisphenol F; and bisphenol F.

6. The oligomer according to claim 3,
wherein said tertiary nitrogen catalyst is selected from a group consisting of 4-dimethylaminopyridine (DMAP), pyridine, imidazole, dimethylimidazole, 2-methylimidazole, and a combination of at least two of the above.

7. The oligomer according to claim 3,
wherein said coupling reagent is selected from a group consisting of N,N'-dicyclohexyl carbodiimide, N,N'-diisopropyl carbodiimide, and a combination of the above.

8. The oligomer according to claim 3,
wherein said acyl transfer agent is selected from a group consisting of DMAP, pyridine, and a combination of the above.

9. The oligomer according to claim 3,
wherein the oligomer has a cured product obtained through a process selected from a group consisting of
  (i) the oligomer, selected from a group consisting of said second oligomer (2,6-dimethylphenylene ether), said third oligomer (2,6-dimethylphenylene ether), and said fourth oligomer (2,6-dimethylphenylene ether) is mixed with a catalyst to process heat-curing to obtain said cured product; and
  (ii) the oligomer, selected from a group consisting of said first oligomer (2,6-dimethylphenylene ether), said second oligomer (2,6-dimethylphenylene ether), and said fourth oligomer (2,6-dimethylphenylene ether) is mixed with an equivalent of epoxy resin to be copolymerized with an agent, selected from a group consisting of an epoxy ring-opening agent and a double-bond initiator, to obtain said cured product through heating.

10. The oligomer according to claim 9,
wherein said catalyst is selected from a group consisting of benzoyl peroxide, t-butyl cumyl peroxide, and a combination of the above.

11. The oligomer according to claim 9,
wherein the oligomer, selected from a group consisting of said second oligomer (2,6-dimethylphenylene ether), said third oligomer (2,6-dimethylphenylene ether), and said fourth oligomer (2,6-dimethylphenylene ether) has a total weight containing 0.1~1.0 wt % of said catalyst.

12. The oligomer according to claim 9,
wherein said epoxy ring-opening agent is selected from a group consisting of DMAP, pyridine, imidazole, dimethylimidazole, 2-methylimidazole, and a combination of at least two of the above.

13. The oligomer according to claim 9,
wherein said epoxy resin has a total weight containing 0.5~2.0 wt % of said epoxy ring-opening agent.

14. The oligomer according to claim 9,
wherein said double-bond initiator is selected from a group consisting of benzoyl peroxide, t-butyl cumyl peroxide, di-t-butyl cumyl peroxide, and a combination of at least two of the above.

15. The oligomer according to claim 9,
wherein each one of said first oligomer (2,6-dimethylphenylene ether), said second oligomer (2,6-dimethylphenylene ether), and said fourth oligomer (2,6-dimethylphenylene ether) has a total weight containing 0.1~1.0 wt % of said double-bond initiator.

* * * * *